(12) United States Patent
Tong et al.

(10) Patent No.: US 10,985,807 B2
(45) Date of Patent: Apr. 20, 2021

(54) BASE STATION AND RADIO TERMINAL

(71) Applicant: KYOCERA CORPORATION, Kyoto (JP)

(72) Inventors: Fangwei Tong, Machida (JP); Chiharu Yamazaki, Tokyo (JP); Noriyoshi Fukuta, Inagi (JP); Akinori Iwabuchi, Machida (JP); Hironobu Kobayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 474 days.

(21) Appl. No.: 15/751,655

(22) PCT Filed: Aug. 5, 2016

(86) PCT No.: PCT/JP2016/073170
§ 371 (c)(1),
(2) Date: Feb. 9, 2018

(87) PCT Pub. No.: WO2017/026407
PCT Pub. Date: Feb. 16, 2017

(65) Prior Publication Data
US 2020/0204221 A1 Jun. 25, 2020

Related U.S. Application Data

(60) Provisional application No. 62/203,622, filed on Aug. 11, 2015.

(30) Foreign Application Priority Data

Aug. 31, 2015 (JP) .............................. JP2015-170172

(51) Int. Cl.
*H04B 7/0417* (2017.01)
*H04L 5/00* (2006.01)

(52) U.S. Cl.
CPC .......... *H04B 7/0417* (2013.01); *H04L 5/005* (2013.01); *H04L 5/0051* (2013.01)

(58) Field of Classification Search
CPC ...... H04B 7/0417; H04L 5/005; H04L 5/0051
See application file for complete search history.

(56) References Cited

U.S. PATENT DOCUMENTS 9,350,478 B2  5/2016 Shimezawa et al.
2011/0312332 A1* 12/2011 Choudhury ........... H04L 1/0029
455/452.2

(Continued)

FOREIGN PATENT DOCUMENTS

JP  2011-035828 A  2/2011
JP  2012-135051 A  7/2012

(Continued)

OTHER PUBLICATIONS

International Search Report issued in PCT/JP2016/073170; dated Oct. 25, 2016.

(Continued)

*Primary Examiner* — David S Huang
(74) *Attorney, Agent, or Firm* — Studebaker & Brackett PC

(57) ABSTRACT

A base station according to an embodiment supports full-dimension MIMO (FD-MIMO). The base station includes: an antenna array having antenna elements arranged two-dimensionally in a horizontal direction and a vertical direction; and a controller configured to perform a process of transmitting a dedicated reference signal that is a reference signal used for measurement of channel characteristics and is individually generated for a radio terminal. The controller is configured to select a specific target radio terminal from among target radio terminals to be connected to the base (Continued)

station, and perform a process of transmitting the dedicated reference signal only to the specific target radio terminal.

19 Claims, 16 Drawing Sheets

(56) References Cited

U.S. PATENT DOCUMENTS

| | | |
|---|---|---|
| 2012/0088458 A1 | 4/2012 | Nogami et al. |
| 2015/0180632 A1 | 6/2015 | Kishiyama et al. |
| 2015/0282123 A1* | 10/2015 | Miao ............... H04L 5/0051 455/450 |
| 2015/0304081 A1* | 10/2015 | Park ............... H04B 7/0417 370/329 |

FOREIGN PATENT DOCUMENTS

| | | |
|---|---|---|
| JP | 2013-126228 A | 6/2013 |
| JP | 2013-225854 A | 10/2013 |
| JP | 2014-027430 A | 2/2014 |
| WO | 2010/146775 A1 | 12/2010 |

OTHER PUBLICATIONS

Motorola Mobility; "Interference Measurements Based on CSI-RS"; 3GPP TSG RAN1 #67; R1-114023; Nov. 14-18, 2011; pp. 1-4; San Francisco, CA, USA.

Kyocera; "CSI Measurement and Feedback for Elevation BF/FD-MIMO"; 3GPP TSG RAN WG1 Meeting #82; R1-154012; Aug. 24-28, 2015; pp. 1-2; Beijing, China.

\* cited by examiner

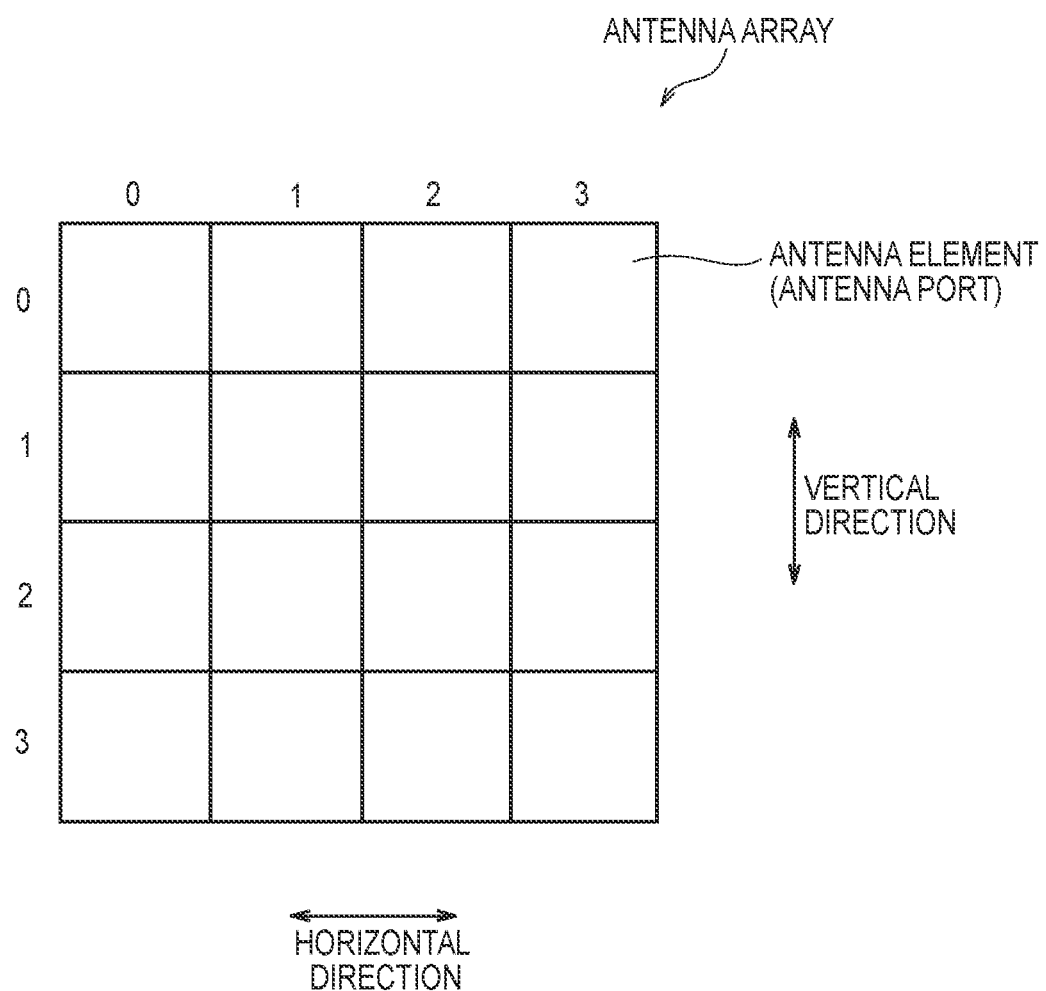

BASE STATION AND RADIO TERMINAL

CROSS-REFERENCE

This application claims the benefit of U.S. Patent Provisional Application No. 62/203,622 (filed on Aug. 11, 2015) and Japanese Patent Application No. 2015-170172 (filed on Aug. 31, 2015), the entire contents of which are incorporated herein by reference.

TECHNICAL FIELD

The present invention relates to a base station and a radio terminal used in a radio communication system.

BACKGROUND ART

In the Third Generation Partnership Project (3GPP) that is a standardization project of a radio communication system, the introduction of multi-input multi-output (MIMO) communication using an antenna array having antenna elements arranged two-dimensionally in a horizontal direction and a vertical direction has been studied. Such MIMO communication is referred to as full-dimension MIMO (FD-MIMO). According to the FD-MIMO, it is possible to control the directionality not only in the horizontal direction but also in the vertical direction by arranging the antenna elements two-dimensionally.

SUMMARY OF INVENTION

A base station according to an embodiment includes a controller configured to perform a process of transmitting a dedicated reference signal that is a reference signal used for measurement of channel characteristics and is individually generated for a radio terminal. The controller is configured to select a specific target radio terminal from among target radio terminals to be connected to the base station, and perform a process of transmitting the dedicated reference signal only to the specific target radio terminal.

A radio terminal according to an embodiment includes a controller configured to perform: a process of receiving, from a base station, a terminal-specific reference signal that is a demodulation reference signal transmitted individually to a radio terminal by the base station; and a process of transmitting, to the base station, channel state information generated by channel estimation using the terminal-specific reference signal.

A base station according to an embodiment includes: a controller configured to perform: a process of transmitting, to a radio terminal, a terminal-specific reference signal that is a demodulation reference signal transmitted individually to the radio terminal; and a process of receiving, from the radio terminal, channel state information generated by the radio terminal by channel estimation using the terminal-specific reference signal.

The terminal-specific reference signal may be included in an allocated radio resource allocated to the radio terminal by the base station. The terminal-specific reference signal may be used not only for demodulation of downlink data included in the allocated radio resource but also for generation of the channel state information.

A processor according to an embodiment controls a radio terminal. The processor is configured to perform: a process of receiving, from a base station, a terminal-specific reference signal that is a demodulation reference signal transmitted individually to a radio terminal by the base station; and a process of transmitting, to the base station, channel state information generated by channel estimation using the terminal-specific reference signal.

BRIEF DESCRIPTION OF DRAWINGS

FIG. 19 is a diagram illustrating an example of an array antenna according to another embodiment.

DESCRIPTION OF EMBODIMENTS

First Embodiment

Overview of First Embodiment

Figure 1:
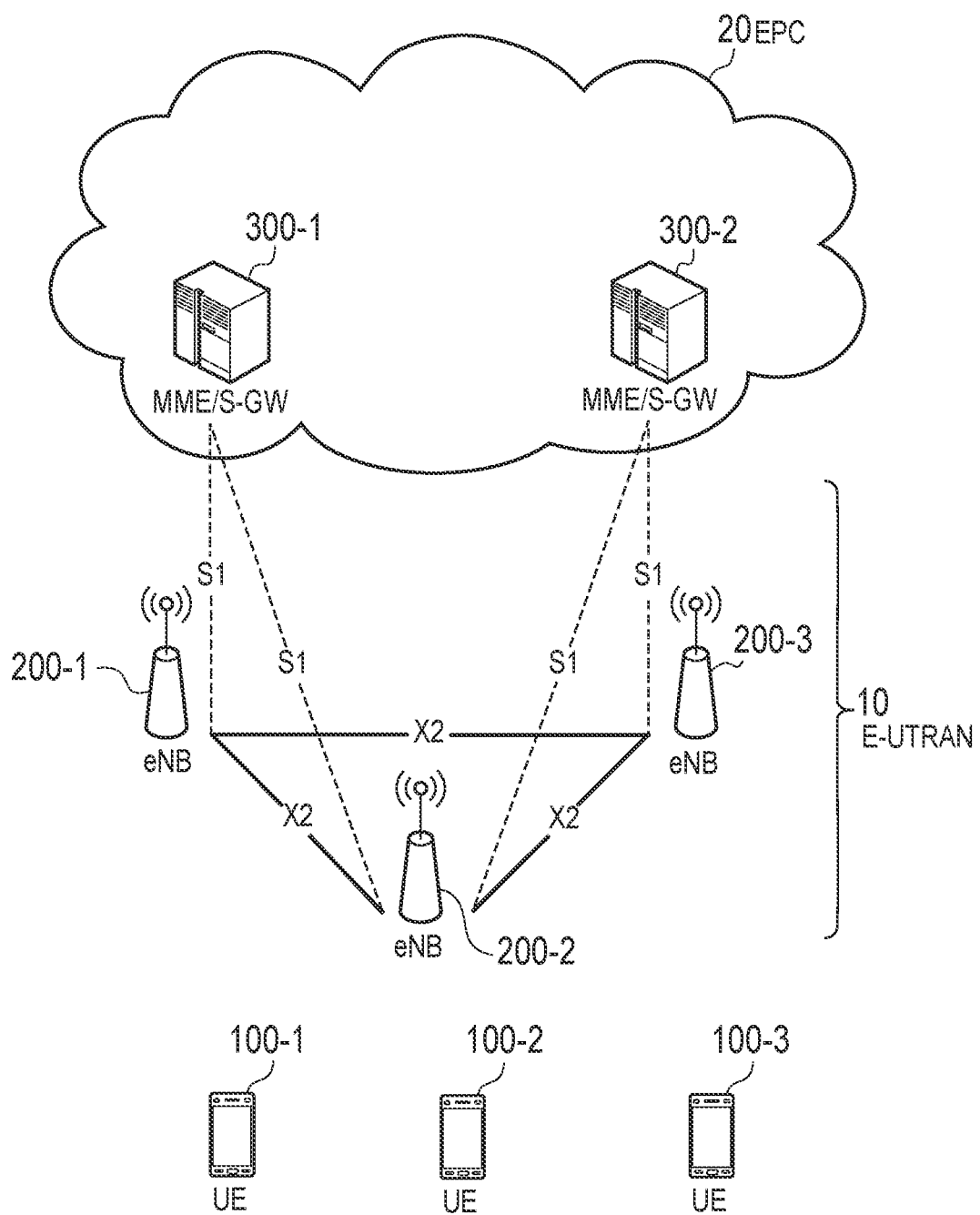
FIG. 1 is a diagram illustrating a structure of an LTE system (radio communication system).

A base station according to a first embodiment includes a controller configured to perform a process of transmitting a dedicated reference signal that is a reference signal used for measurement of channel characteristics and is individually generated for a radio terminal. The controller is configured to select a specific target radio terminal from among target radio terminals to be connected to the base station, and perform a process of transmitting the dedicated reference signal only to the specific target radio terminal.

The base station may be configured to support full-dimension MIMO (FD-MIMO), and the base station may further comprise an antenna array having antenna elements arranged two-dimensionally in a horizontal direction and a vertical direction.

The controller may be configured to: perform a process of transmitting a common reference signal that is a reference signal used for measurement of channel characteristics and is common to the target radio terminals; and based on the process, select the specific target radio terminal.

The dedicated reference signal may be a reference signal used for measurement of channel characteristics performed two-dimensionally in a horizontal direction and a vertical direction, and the common reference signal may be a reference signal used for measurement of channel characteristics in one dimension.

The controller may be configured to: receive, from the target radio terminals, channel state information fed back based on the common reference signal; compare downlink data transmission performance derived based on the channel state information with a performance index; and select a target radio terminal, of which the data transmission performance is lower than the performance index, as the specific target radio terminal.

The performance index may be an average downlink data transmission performance of all the target radio terminals.

The controller may be configured to determine a radio terminal supporting the FD-MIMO as the target radio terminals, based on capability information of each radio terminal connected to the base station.

The controller may be configured to select, as the specific target radio terminal, a radio terminal having transmitted, to the base station, request information for requesting the transmission of the dedicated reference signal.

A radio terminal according to a first embodiment includes a controller configured to perform a process of transmitting, to a base station, request information for requesting transmission of a dedicated reference signal that is a reference signal used for measurement of channel characteristics and is generated individually for a radio terminal.

The dedicated reference signal may be a reference signal used for measurement of channel characteristics performed two-dimensionally in a horizontal direction and a vertical direction.

A base station according to a first embodiment includes: a controller configured to perform a process of transmitting configuration information of a specific transmission mode (TM) to a radio terminal. The specific TM supports a feedback of channel state information using a dedicated reference signal, and a feedback of channel state information using a common reference signal. The dedicated reference signal is a reference signal that is used for measurement of channel characteristics and a reference signal that is generated individually for a radio terminal. The common reference signal is a reference signal that is used for measurement of channel characteristics and a reference signal that is common to a plurality of radio terminals.

The specific TM may be a TM for full-dimension MIMO (FD-MIMO).

The dedicated reference signal may be a reference signal used for measurement of channel characteristics performed two-dimensionally in a horizontal direction and a vertical direction, and the common reference signal may be a reference signal used for measurement of channel characteristics in one dimension.

The controller may be configured to, after transmitting the configuration information, perform a process of transmitting, to the radio terminal, a switching instruction for switching between the feedback of the channel state information using the common reference signal and the feedback of the channel state information using the dedicated reference signal.

The controller may be configured to perform: a process of transmitting the configuration information to the radio terminal by signaling of an RRC layer; and a process of transmitting the switching instruction to the radio terminal by signaling of a lower layer than the RRC layer.

A radio terminal according to a first embodiment includes: a controller configured to perform a process of receiving configuration information of a specific transmission mode (TM) from a base station. The specific TM is configured to support a feedback of channel state information using a dedicated reference signal, and a feedback of channel state information using a common reference signal. The dedicated reference signal is a reference signal that is used for measurement of channel characteristics and a reference signal that is generated individually for a radio terminal. The common reference signal is a reference signal that is used for measurement of channel characteristics and a reference signal that is common to a plurality of radio terminals.

The specific TM may be a TM for full-dimension MIMO (FD-MIMO).

The dedicated reference signal may be a reference signal used for measurement of channel characteristics performed two-dimensionally in a horizontal direction and a vertical direction, and the common reference signal may be a reference signal used for measurement of channel characteristics in one dimension.

The controller may be configured to, after receiving the configuration information, perform a process of receiving, from the base station, a switching instruction for switching between the feedback of the channel state information using the common reference signal and the feedback of the channel state information using the dedicated reference signal.

The controller may be configured to perform: a process of receiving the configuration information from the base station by signaling of an RRC layer; and a process of receiving the switching instruction from the base station by signaling of a lower layer than the RRC layer.

Structure of Radio Communication System

FIG. 1 is a diagram illustrating a structure of a Long Term Evolution (LTE) system that is a radio communication system according to a first embodiment. As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a radio terminal. The UE 100 is a mobile communication apparatus and performs radio communication with an eNB 200.

The E-UTRAN 10 corresponds to a radio access network. The E-UTRAN 10 includes the eNB (evolved Node-B) 200. The eNB 200 corresponds to a base station. The eNBs 200 are connected to each other via an X2 interface.

The eNB 200 manages one or more cells and performs radio communication with the UE 100 having established the connection to the cell. The eNB 200 has a radio resource management (RRM) function, a user data (hereinafter, simply referred to as "data") routing function, a measurement control function for mobility control and scheduling, and the like. The "cell" is used as the term indicating a minimum unit of a radio communication area and is also used as the term indicating a function of performing radio communication with the UE 100.

The EPC 20 corresponds to a core network. The EPC 20 includes a mobility management entity (MME)/serving-gateway (S-GW) 300. The MME performs a variety of mobility control or the like on the UE 100. The S-GW performs data transfer control. The MME/S-GW 300 is connected to the eNB 200 via an S1 interface.

Structure of Radio Terminal

Figure 2:
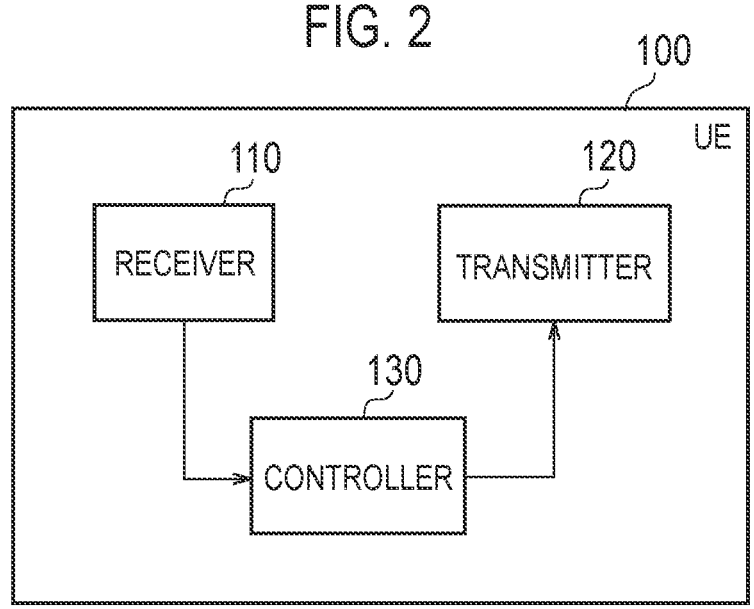
FIG. 2 is a block diagram of a UE (radio terminal).

FIG. 2 is a block diagram of the UE 100 (radio terminal). As illustrated in FIG. 2, the UE 100 includes a receiver 110, a transmitter 120, and a controller 130.

The receiver 110 performs a variety of reception under the control of the controller 130. The receiver 110 includes an antenna and a reception apparatus. The reception apparatus converts a radio signal received by the antenna into a baseband signal (reception signal) and outputs the baseband signal to the controller 130. The transmitter 120 performs a variety of transmission under the control of the controller 130. The transmitter 120 includes an antenna and a transmission apparatus. The transmission apparatus converts a baseband signal (transmission signal) output by the controller 130 into a radio signal and transmits the radio signal from the antenna. The antenna included in the UE 100 is provided with a plurality of antenna elements.

The controller 130 performs a variety of control on the UE 100. The controller 130 includes a processor and a memory. The memory stores a program executed by the processor, and information used for processing by the processor. The processor includes a baseband processor that performs modulation and demodulation, coding and decoding, and the like of the baseband signal, and a central processing unit (CPU) that performs a variety of processes by executing a program stored in the memory. The processor may include a codec that performs coding and decoding of an audio or video signal. The processor performs the above-described process and a process to be described later.

Structure of Base Station

Figure 3:
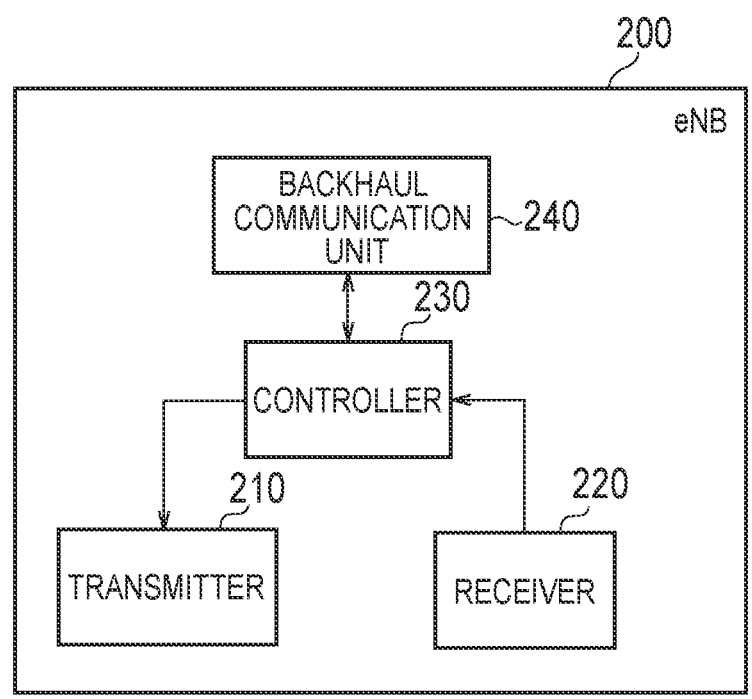
FIG. 3 is a block diagram of an eNB (base station).

FIG. 3 is a block diagram of the eNB 200 (base station). As illustrated in FIG. 3, the eNB 200 includes a transmitter 210, a receiver 220, a controller 230, and a backhaul communication unit 240.

The transmitter 210 performs a variety of transmission under the control of the controller 230. The transmitter 210 includes an antenna and a transmission apparatus. The transmission apparatus converts a baseband signal (transmission signal) output by the controller 230 into a radio signal and transmits the radio signal from the antenna. The receiver 220 performs a variety of reception under the control of the controller 230. The receiver 220 includes an antenna and a reception apparatus. The reception apparatus converts a radio signal received by the antenna into a baseband signal (reception signal) and outputs the baseband signal to the controller 230.

The controller 230 performs a variety of control on the eNB 200. The controller 230 includes a processor and a memory. The memory stores a program executed by the processor, and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs the above-described process and a process to be described later.

The backhaul communication unit 240 is connected to the neighbour eNB 200 via an X2 interface and connected to the MME/S-GW 300 via an S1 interface. The backhaul communication unit 240 is used for communication performed on the X2 interface, communication performed on the S1 interface, and the like.

Figure 4:
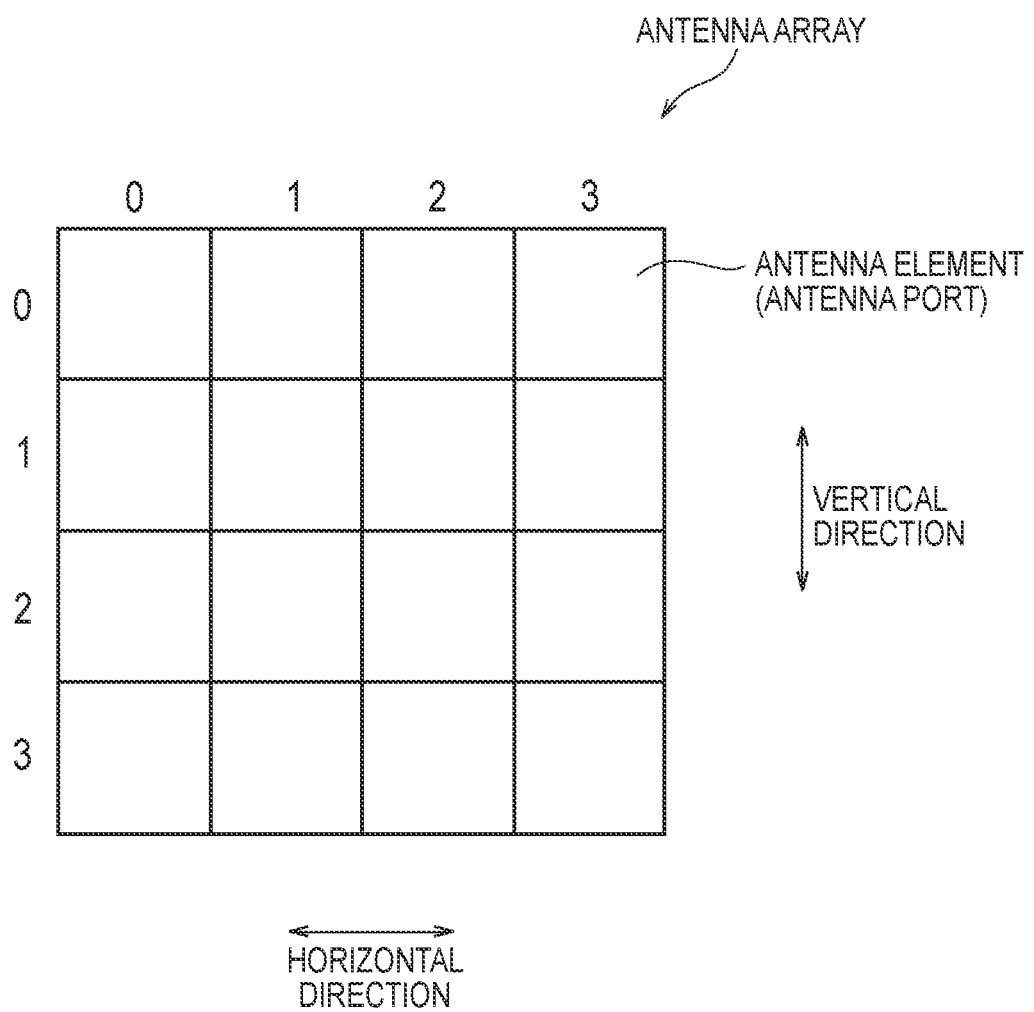
FIG. 4 is a diagram illustrating an example of an antenna (antenna array) provided in an eNB.

FIG. 4 is a diagram illustrating an example of the antenna (antenna array) provided in the eNB 200. As illustrated in FIG. 4, the antenna array has antenna elements (antenna ports) arranged two-dimensionally in a horizontal direction and a vertical direction. FIG. 4 illustrates an example in which the antenna array has a total of 16 antenna elements, that is, four in the horizontal direction and four in the vertical direction.

Structure of Radio Interface

Figure 5:
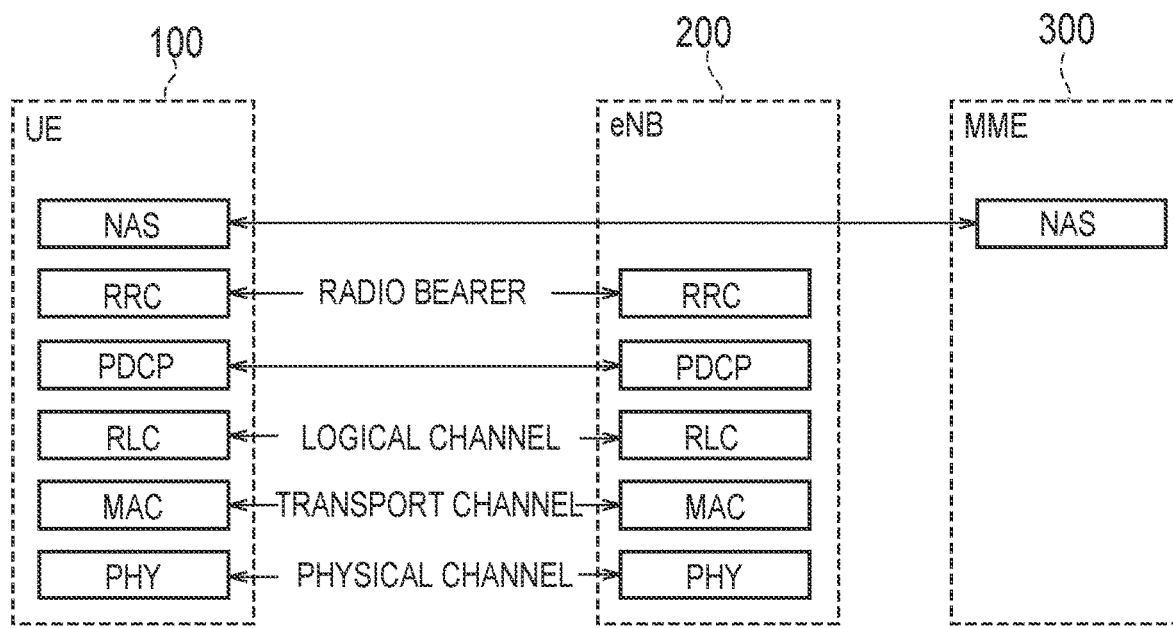
FIG. 5 is a protocol stack diagram of a radio interface in an LTE system.

FIG. 5 is a protocol stack diagram of a radio interface in the LTE system. As illustrated in FIG. 5, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control signals are transmitted between the MAC layer of the UE 100 and the MAC layer of the eNB 200 via a transport channel. The MAC layer of the eNB 200 includes a scheduler that determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. A message (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode; otherwise, the UE 100 is in an RRC idle mode.

A non-access stratum (NAS) layer, which is located above the RRC layer, performs session management, mobility management, and the like.

Overview of LTE Lower Layer

Figure 6:
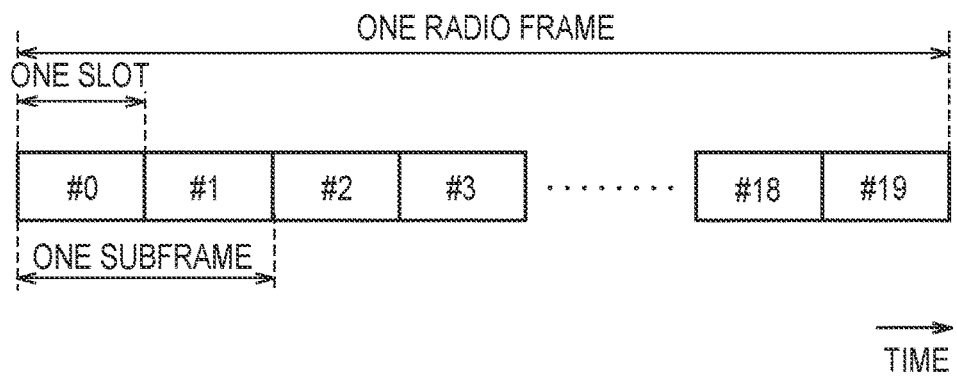
FIG. 6 is a configuration diagram of a radio frame used in an LTE system.

FIG. 6 is a configuration diagram of a radio frame used in the LTE system. In the LTE system, orthogonal frequency division multiple access (OFDMA) is applied to downlink, and single carrier frequency division multiple access (SC-FDMA) is applied to uplink.

As illustrated in FIG. 6, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). In addition, among the radio resources (time and frequency resources) allocated to the UE 100, the frequency resource can be specified by the resource block and the time resource can be specified by the subframe (or slot).

In the downlink, a section of several symbols in the head of each subframe is a region that is mainly used as a physical downlink control channel (PDCCH) for transmitting a downlink control signal. Details of the PDCCH will be described later. In addition, the remaining portion of each subframe is a region that can mainly be used as a physical downlink shared channel (PDSCH) for transmitting downlink data.

Basically, the eNB 200 transmits downlink control information (DCI) to the UE 100 by using the PDCCH and transmits downlink data to the UE 100 by using the PDSCH. The downlink control signal carried by the PDCCH includes uplink scheduling information (SI), downlink SI, and a TPC bit. The uplink SI is scheduling information (UL grant) about allocation of uplink radio resources, and the downlink SI is scheduling information about allocation of downlink radio resources. The TPC bit is information instructing increase or decrease of uplink transmission power. The eNB 200 includes a CRC bit scrambled with an identifier (RNTI: radio network temporary ID) of the destination UE 100 in the downlink control signal so as to identify the UE 100 that is the transmission destination of the downlink control signal. Each UE 100 performs blind decoding on the PDCCH with respect to the downlink control signal that may be addressed to the UE, and detects the downlink control signal addressed to the UE. The PDSCH carries downlink data by the downlink radio resource (resource block) indicated by the downlink SI.

In the uplink, both end portions in the frequency direction in each subframe is a region that is mainly used as a physical uplink control channel (PUCCH) for transmitting an uplink control signal. The remaining portion of each subframe is a region that can mainly be used as a physical uplink shared channel (PUSCH) for transmitting uplink data.

Basically, the UE 100 transmits uplink control information (UCI) to the eNB 200 by using the PUCCH and transmits uplink data to the eNB 200 by using the PUSCH. The uplink control signal carried by the PUCCH includes a channel quality indicator (CQI), a precoding matrix indicator (PMI), a rank indicator (RI), a scheduling request (SR), and HARQ ACK/NACK. The CQI is an index indicating downlink channel quality and is used for determining the MCS to be used for downlink transmission or the like. The PMI is an index indicating a precoder matrix that is preferably used for downlink transmission. The RI is an index indicating the number of layers (number of streams) that can be used for downlink transmission. The SR is information requesting allocation of PUSCH resources. The HARQ ACK/NACK is transmission acknowledgment information indicating whether the downlink data has been correctly received.

Overview of Downlink MIMO

Figure 7:
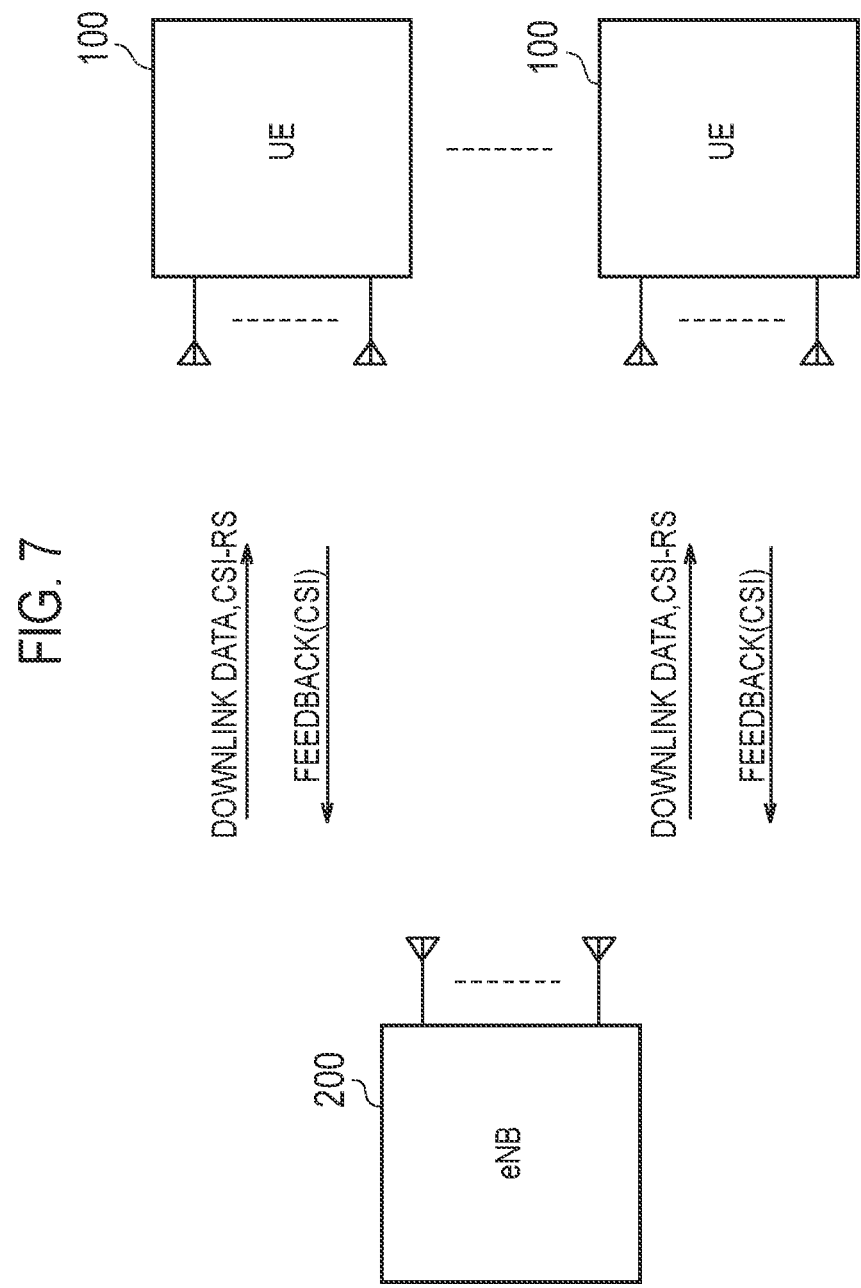
FIG. 7 is a diagram for describing an overview of downlink MIMO.

FIG. 7 is a diagram for describing an overview of downlink MIMO.

As illustrated in FIG. 7, a plurality of UEs 100 is connected to the eNB 200. Specifically, the plurality of UEs 100 is in an RRC connected mode in the cell of the eNB 200. The eNB 200 and each UE 100 have a plurality of antenna elements (antenna ports). The eNB 200 transmits downlink data to each UE 100 by using a plurality of transmission antenna elements.

The eNB 200 transmits a plurality of modulation symbol sequences to one UE 100 by spatial division multiplexing (SDM) using the same radio resources (time and frequency resources). Such a method is referred to as single-user MIMO (SU-MIMO). Alternatively, the eNB 200 transmits a plurality of modulation symbol sequences to different UEs 100 by SDM using the same radio resources (time and frequency resources). Such a method is referred to as multi-user MIMO (MU-MIMO).

The eNB 200 transmits a reference signal for measurement of channel characteristics (that is, channel estimation) before transmitting user data. Such a reference signal is referred to as a channel state information-reference signal (CSI-RS). The UE 100 estimates channel characteristics based on the CSI-RS received from the eNB 200. Based on the channel estimation result, the UE 100 generates channel state information (CSI) indicating a channel state, and feeds the generated CSI back to the eNB 200. The CSI is at least one of CQI, PMI, and RI. The eNB 200 controls downlink data transmission (in particular, MCS) based on the CSI fed back from the UE 100.

In the general MIMO, the eNB 200 performs data transmission by using each transmission antenna element arranged one-dimensionally in the horizontal direction. In addition, the eNB 200 transmits the CSI-RS by using each transmission antenna element arranged one-dimensionally. Such a CSI-RS is a reference signal common to the plurality of UEs 100. In addition, the reference signal is used for measurement of channel characteristics (channel estimation) in one dimension. Hereinafter, such a common reference signal is referred to as "existing CSI-RS". The "existing CSI-RS" is not limited to CSI-RS introduced in Release 10 of the 3GPP standard, but includes all reference signals up to Release 12. For example, a discovery reference signal (DRS) is also included in the concept of the existing CSI-RS.

On the other hand, in the FD-MIMO, the eNB 200 performs data transmission by using each transmission antenna element arranged two-dimensionally in the horizontal direction and the vertical direction. In addition, the eNB 200 transmits the CSI-RS by using transmission antenna elements arranged two-dimensionally. Although the FD-MIMO can improve data transmission performance as compared with the general MIMO, there is a problem that the transmission amount of the reference signal (CSI-RS) for the FD-MIMO, that is, the overhead increases.

Operation According to First Embodiment

Hereinafter, an operation according to the first embodiment will be described.

(1) Operation Flow of eNB 200

The eNB 200 according to the first embodiment supports an FD-MIMO. The eNB 200 generates and transmits a reference signal for the individual UE 100. The reference signal is a reference signal used for measurement of channel characteristics (channel estimation) in two dimensions. Hereinafter, such a dedicated reference signal is referred to as "2D UE-specific CSI-RS". The "2D UE-specific CSI-RS" is a reference signal for FD-MIMO.

The eNB 200 selects a specific target UE 100 from a plurality of target UEs 100 connected to the eNB 200 and transmits the "2D UE-specific CSI-RS" only to the specific target UE 100. In this way, the overhead can be suppressed, as compared with the case of transmitting the "2D UE-specific CSI-RS" to all the target UEs 100.

In the first embodiment, the eNB 200 receives, from the plurality of target UEs 100, channel state information (CSI) fed back based on an existing CSI-RS, and selects the specific target UE 100 based on the channel state information. Specifically, the eNB 200 selects the target UE 100, to which the "2D UE-specific CSI-RS" needs to be transmitted, according to a modulation and coding scheme (MCS) determined based on the channel state information based on the existing CSI-RS. Therefore, since the eNB 200 can transmit the "2D UE-specific CSI-RS" only to the target UE 100, of which data transmission performance should be improved, it is possible to improve the data transmission performance while suppressing the overhead.

Figure 8:
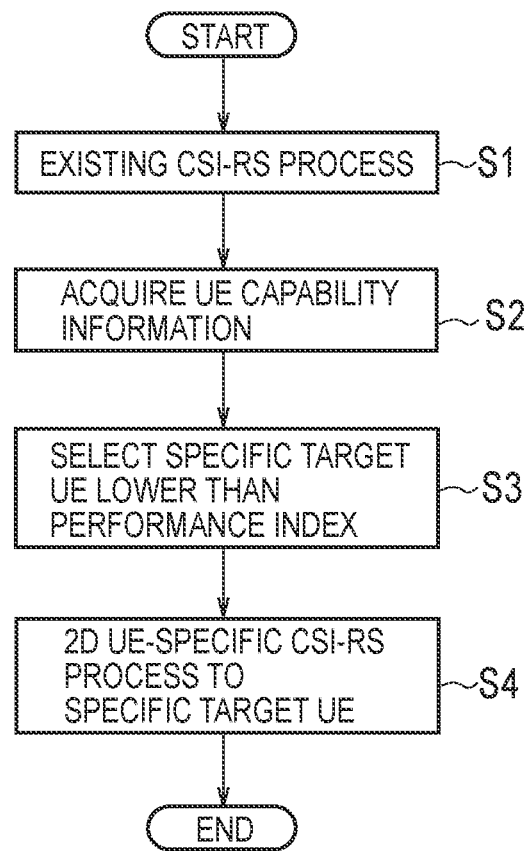
FIG. 8 is a diagram illustrating an operation flow of an eNB according to a first embodiment.

FIG. 8 is a diagram illustrating the operation flow of the eNB 200 according to the first embodiment.

As illustrated in FIG. 8, in step S1, the eNB 200 transmits the existing CSI-RS to all the UEs 100 and receives the CSI fed back from all the UEs 100 based on the existing CSI-RS. Then, the eNB 200 transmits downlink data to the UE 100 based on the CSI. It is noted that step S1 is a process according to the current LTE specification.

In step S2, the eNB 200 determines the target UE 100 from the UEs 100 connected to the eNB 200. Specifically, the eNB 200 acquires terminal capability information (UE capability information) of each UE 100 connected to the eNB 200, and determines the UE 100 supporting FD-MIMO as the target UE 100. Whether the FD-MIMO is supported may be indicated by UE category information (UE category). The "UE capability information" is a type of signaling of an RRC layer (RRC signaling), and is information received from the UE 100 by the eNB 200. Alternatively, the "UE capability information" can be acquired from an MME by the eNB 200. If it is assumed that all the UEs 100 connected to the eNB 200 support the FD-MIMO, the eNB 200 may determine all the UEs 100 as the target UE 100.

In step S3, the eNB 200 derives the downlink data transmission performance based on the CSI for each target UE 100, compares the downlink data transmission performance with a performance index, and selects the target UE 100, of which the data transmission performance is lower than the performance index, as the specific target UE 100. For the target UE 100, of which the data transmission performance exceeds the performance index, the eNB 200 performs data transmission by directly using downlink MCS determined according to the CSI fed back from the UE 100 by using the existing CSI-RS.

In the first embodiment, the downlink data transmission performance is a data rate. The eNB 200 may calculate the data rate from the MCS, or may measure the data rate when data is actually transmitted according to the MCS. If the data rate is calculated from the MCS, the eNB 200 obtains a corresponding transport block size (TBS) index from the index of the MCS determined by the CSI fed back from the UE 100. In addition, the eNB 200 obtains the TBS size per layer from the number of resource blocks used for transmission and the TBS index. Here, the TBS size is the number of bits that can be transmitted in one subframe. Then, the eNB 200 calculates the data rate from the number of layers used for transmission and the TBS size.

In addition, in the first embodiment, the performance index is average data transmission performance (average data rate) of all the target UEs 100. The performance index may be periodically updated. The method of configuring and updating the performance index will be described later.

In step S4, the eNB 200 transmits the "2D UE-specific CSI-RS" to the specific target UE 100 selected in step S3. Here, the eNB 200 may generate and transmit the "2D UE-specific CSI-RS" based on the CSI received from the specific target UE 100 in step S2. For example, the eNB 200 generates and transmits the "2D UE-specific CSI-RS" based on a PMI included in the CSI. Alternatively, the eNB 200 may estimate a direction of the specific target UE 100 based on the CSI and may transmit the "2D UE-specific CSI-RS" towards the estimated direction.

In addition, the eNB 200 receives the CSI fed back from the specific target UE 100 that has measured the channel by using the "2D UE-specific CSI-RS". Then, the eNB 200 determines the MCS again based on the received CSI, and transmits the downlink data to the specific target UE 100.

Figure 9:
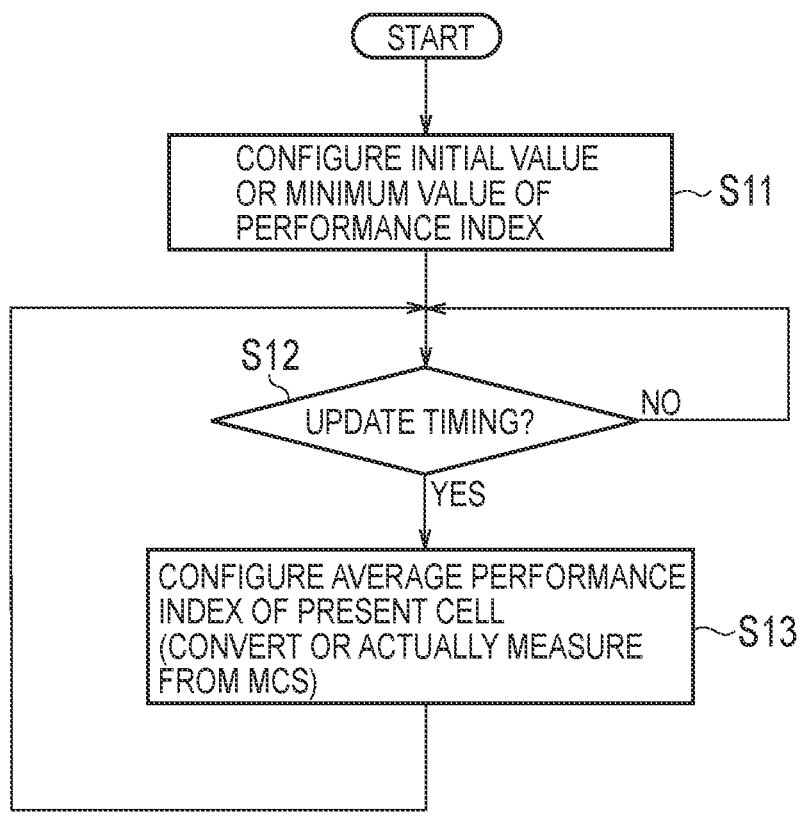
FIG. 9 is a flow diagram illustrating an example of a method of configuring and updating a performance index according to the first embodiment.

Next, a method of configuring and updating a performance index will be described. FIG. 9 is a flow diagram illustrating an example of a method of configuring and updating a performance index.

As illustrated in FIG. 9, in step S11, the eNB 200 configures an initial value or a minimum value of the performance index. The initial value of the performance index is a predetermined data rate (for example, 3 Mbps). The minimum value of the performance index is a minimum data rate to be guaranteed.

In step S12, the eNB 200 determines whether it is an update timing of the performance index. The update timing of the performance index is a timing corresponding to a predetermined cycle (for example, 30 minutes). In the case of a periodic update, the eNB 200 accumulates the data transmission performance (data rate) derived for each target UE 100 up to the update timing. Alternatively, instead of the periodic update, an immediate update may be performed. In the case of the immediate update, the performance index is immediately updated when a new data rate is derived for the target UE 100.

In the case of the update timing of the performance index (step S12: Yes), in step S13, the eNB 200 calculates an average data rate of all the target UEs 100 in the present cell and updates the calculated average data rate as the performance index. After that, the eNB 200 returns the process to step S12.

(2) TM According to First Embodiment

Hereinafter, a transmission mode (TM) according to the first embodiment will be described. The TM is information indicating a transmission scheme between the eNB 200 and the UE 100, and is configured for each UE 100 by RRC signaling.

If the eNB 200 and the UE 100 transmit and receive the existing CSI-RS, an existing TM (for example, TM 9) is applied. On the other hand, if the eNB 200 and the UE 100 transmit and receive the "2D UE-specific CSI-RS", it is considered that a new TM different from the existing TM is applied.

Therefore, if switching from the existing CSI-RS to the "2D UE-specific CSI-RS", a process of reconfiguring the TM between the eNB 200 and the UE 100 may be required. Specifically, if the eNB 200 switches from the transmission of the existing CSI-RS to the transmission of the "2D UE-specific CSI-RS" for the specific target UE 100, the eNB 200 transmits RRC signaling (for example, an "RRC connection reconfiguration" message) for reconfiguring the TM to the specific target UE 100.

However, if the reconfiguration of the TM is performed, there is a problem that a delay for switching from the existing CSI-RS to the "2D UE-specific CSI-RS" occurs and the signaling overhead increases.

In the first embodiment, the TM for the FD-MIMO supports CSI feedback using the "2D UE-specific CSI-RS" and CSI feedback using the existing CSI-RS. Thus, since the TM for the FD-MIMO supports the CSI feedback using the existing CSI-RS, the CSI feedback using the existing CSI-RS is also possible under the new TM for the FD-MIMO. Therefore, RRC signaling for TM switching as described above does not occur, and an efficient operation becomes possible.

(3) Operation Sequence

Figure 10:
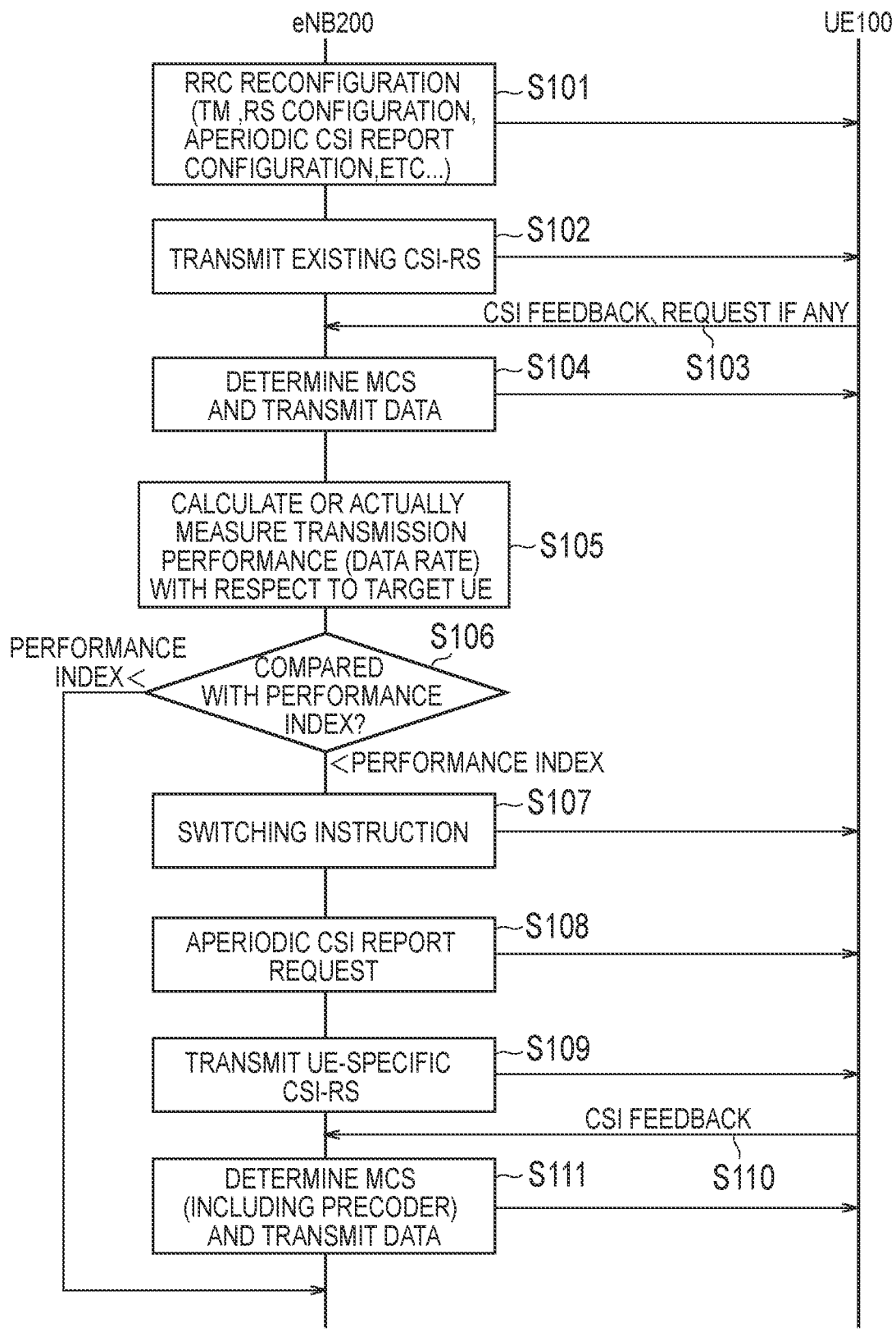
FIG. 10 is a diagram illustrating an example of an operation sequence according to the first embodiment.

Hereinafter, an example of an operation sequence according to the first embodiment will be described. FIG. 10 is a diagram illustrating an example of the operation sequence according to the first embodiment. The UE 100 illustrated in FIG. 10 is a target UE (a UE supporting FD-MIMO).

As illustrated in FIG. 10, in step S101, the eNB 200 transmits, to the UE 100, an "RRC connection reconfiguration" message including a transmission mode (TM) for the FD-MIMO. The "RRC connection reconfiguration" message is dedicated RRC signaling addressed to the UE 100. Configuration information of the TM is included in, for example, "AntennaInfo IE".

In addition, the eNB 200 transmits, to the UE 100, a configuration parameter for the "2D UE-specific CSI-RS" and a configuration parameter for the existing CSI-RS. It is noted that the configuration parameter is, for example, information indicating the signal configuration of the reference signal. Such a configuration parameter (RS configuration) for the reference signal is included in "CQI-Report-Config IE", "CSI-RS-Config IE", or the like. For example, a new configuration parameter for the "2D UE-specific CSI-RS" is added in the "CSI-RS-Config IE".

The configuration parameter may include information about configuration of a CSI report. Since the CSI report of the "2D UE-specific CSI-RS" according to the first embodiment is preferably an aperiodic report (aperiodic CSI report), the CSI report may include aperiodic CSI report configuration information.

The UE 100 having received the "RRC connection reconfiguration" message stores the TM for the FD-MIMO. In addition, the UE 100 stores the configuration parameter for the "2D UE-specific CSI-RS" and the configuration parameter for the existing CSI-RS. If the TM for the FD-MIMO is selected, the UE 100 can use the configuration parameter for the "2D UE-specific CSI-RS" in addition to the configuration parameter for the existing CSI-RS.

The UE 100 applies the configuration parameter for the existing CSI-RS by default. Alternatively, the configuration information of the TM for the FD-MIMO may include information explicitly designating a reference signal to be used for channel measurement among the existing CSI-RS and the "2D UE-specific CSI-RS". In this case, the UE 100 applies the configuration parameter for the existing CSI-RS based on the information designating the existing CSI-RS.

In step S102, the eNB 200 transmits the existing CSI-RS. The UE 100 measures the channel by using the existing CSI-RS and generates the CSI based on the existing CSI-RS.

In step S103, the UE 100 transmits the CSI to the eNB 200 (CSI feedback). The eNB 200 receives the CSI. The UE 100 may further request the eNB 200 to transmit the "2D UE-specific CSI-RS". The request will be described in modification 1 of the first embodiment.

In step S104, the eNB 200 determines an MCS based on the CSI and transmits downlink data to the UE 100. The UE 100 receives the downlink data.

In step S105, the eNB 200 calculates or measures downlink data transmission performance (data rate) of the target UE 100.

In step S106, the eNB 200 compares the downlink data transmission performance of the target UE 100 with the performance index. If the downlink data transmission performance of the target UE 100 exceeds the performance index, the eNB 200 maintains the MCS determined by the existing CSI-RS, continues the downlink data transmission of the target UE 100, and does not perform switching to the transmission of the "2D UE-specific CSI-RS".

On the other hand, if the downlink data transmission performance of the UE 100 is lower than the performance index, in step S107, the eNB 200 instructs the UE 100 to switch from the CSI feedback using the existing CSI-RS to the CSI feedback using the "2D UE-specific CSI-RS". Alternatively, the eNB 200 may issue a switching instruction in response to a request from the UE 100. The UE 100 receives the switching instruction. Here, the eNB 200 issues the switching instruction by signaling of a lower layer (for example, a MAC layer or a PHY layer) than an RRC. For example, the eNB 200 may issue the switching instruction by MAC control element (CE), or may issue the switching instruction by DCI.

In addition, the eNB 200 and the UE 100 may determine that the switching of the reference signal used for the CSI feedback occurs at the lapse of a predetermined period (for example, eight subframes) from the timing (subframe) at which the switching instruction is transmitted and received. In this case, the UE 100 may switch to the configuration parameter for the "2D UE-specific CSI-RS" at the lapse of a predetermined period from the timing at which the switching instruction is transmitted and received. The eNB 200 may start transmission of the "2D UE-specific CSI-RS" from the timing (subframe) at which the switching of the reference signal used for the CSI feedback occurs.

In step S108, the eNB 200 requests the UE 100 for the CSI feedback (report) using the "2D UE-specific CSI-RS".

In step S109, the eNB 200 transmits the "2D UE-specific CSI-RS" to the UE 100. The UE 100 measures the channel by using the "2D UE-specific CSI-RS" and generates a CSI based on the "2D UE-specific CSI-RS".

In step S110, the UE 100 transmits the CSI to the eNB 200 (CSI feedback). The eNB 200 receives the CSI.

In step S111, the eNB 200 determines an MCS based on the CSI and transmits downlink data to the UE 100. The UE 100 receives the downlink data.

In this sequence, the switching from the CSI feedback using the existing CSI-RS to the CSI feedback using the "2D UE-specific CSI-RS" has been described. However, the eNB 200 may instruct the UE 100 performing the CSI feedback using the "2D UE-specific CSI-RS" to switch to the CSI feedback using the existing CSI-RS. In addition, the eNB 200 and the UE 100 may determine that the switching of the reference signal used for the CSI feedback occurs at the lapse of a predetermined period (for example, eight subframes) from the timing (subframe) at which the switching instruction is transmitted and received. The eNB 200 may stop the transmission of the "2D UE-specific CSI-RS" from the timing (subframe) at which the switching of the reference signal used for the CSI feedback occurs.

In addition, an example in which the CSI feedback using the "2D UE-specific CSI-RS" is the aperiodic CSI report has been described, but the CSI using the "2D UE-specific CSI-RS" may be fed back in a periodic CSI report.

Modification 1 of First Embodiment

In the first embodiment described above, an example in which the eNB 200 selects the specific target UE 100 by comparing the downlink data transmission performance with the performance index for each target UE 100 has been described. However, instead of such a method, the eNB 200 may transmit the "2D UE-specific CSI-RS" to the UE 100 in response to a request from the UE 100.

For example, when the CSI is worse than a predetermined value or an expected value, when the UE 100 determines that the deviation of the measurement result from the propagation situation is large, or when the CSI greatly varies from the previous measurement result, the UE 100 determines that the channel estimation by the "2D UE-specific CSI-RS" is necessary, and transmits request information requesting the transmission of the "2D UE-specific CSI-RS" to the eNB 200. Alternatively, the UE 100 transmits, to the eNB 200, the request information requesting the transmission of the "2D UE-specific CSI-RS" according to a situation of a service used by the UE 100 (for example, when it is necessary to receive a large amount of data, such as a video signal, at high speed).

Figure 11:
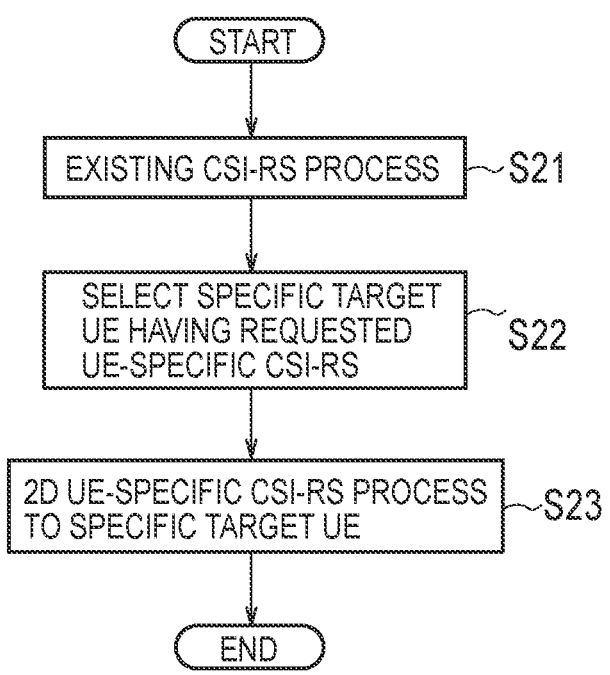
FIG. 11 is a diagram illustrating an operation flow of an eNB according to modification 1 of the first embodiment.

FIG. 11 is a diagram illustrating an operation flow of an eNB 200 according to modification 1 of the first embodiment. Here, differences from the first embodiment described above will be mainly described.

As illustrated in FIG. 11, in step S21, the eNB 200 transmits the existing CSI-RS to all the UEs 100 and receives the CSI fed back from the UEs 100 based on the existing CSI-RS. Then, the eNB 200 transmits downlink data to the UE 100 based on the CSI.

In step S22, the eNB 200 selects, as the specific target UE 100, the UE 100 that has transmitted the request information requesting the transmission of the "2D UE-specific CSI-RS". It is noted that the eNB 200 continues to use the downlink MCS determined by the existing CSI-RS with respect to the UE 100 that has not transmitted the request information.

In step S23, the eNB 200 transmits the "2D UE-specific CSI-RS" to the specific target UE 100 selected in step S22. The CSI fed back from the specific target UE 100 that has measured the channel by using the "2D UE-specific CSI-RS" is received. Then, the eNB 200 determines the MCS based on the received CSI, and transmits the downlink data to the specific target UE 100.

Modification 2 of First Embodiment

In the first embodiment described above, an example in which the eNB 200 updates the performance index periodically or immediately has been described. By repeating such an update, the performance index gradually increases, and thus it may be necessary to transmit the "2D UE-specific CSI-RS" to all the target UEs 100. As a result, there is a possibility that the purpose of suppressing the overhead cannot be achieved. In modification 2 of the first embodiment, a method for solving this problem will be described.

Figure 12:
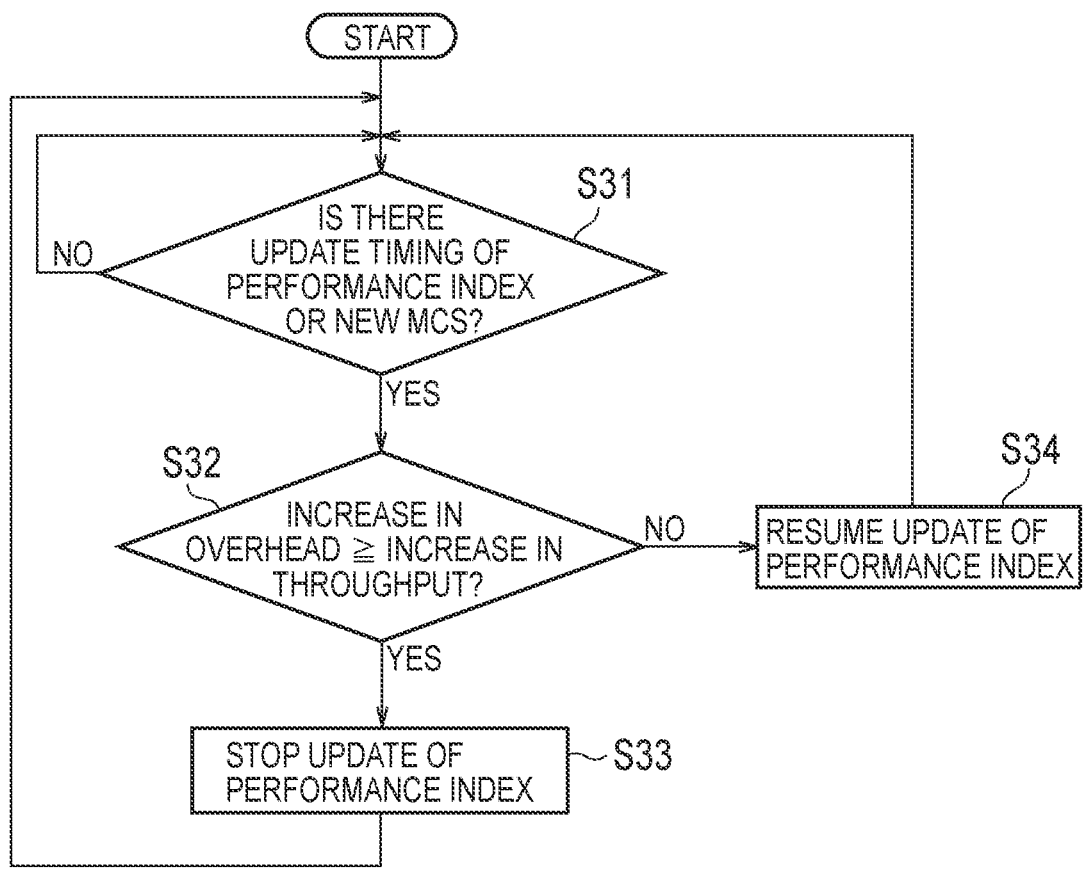
FIG. 12 is a diagram illustrating an operation flow of an eNB according to modification 2 of the first embodiment.

FIG. 12 is a diagram illustrating an operation flow of an eNB 200 according to modification 2 of the first embodiment.

As illustrated in FIG. 12, when an update timing of a performance index or a new data rate is derived (that is, when there is a new MCS) (step S31: Yes), the eNB 200 compares an increase situation of the overhead with an increase situation of the corresponding throughput (step S32). Here, the "increase situation" is, for example, an increase rate or an increase amount. In addition, the "overhead" is "2D UE-specific CSI-RS", CSI based on "2D UE-specific CSI-RS", configuration information of "2D UE-specific CSI-RS", and the like. The "corresponding throughput" is the throughput of the target UE 100 and is calculated by, for example, "performance index×number of target UEs 100". Alternatively, the sum of the transmission performances (data rates) of all the target UEs 100 may be set as the corresponding throughput.

If the increase situation of the overhead is equal to or greater than the increase situation of the corresponding throughput (step S32: Yes), the eNB 200 stops the update of the performance index (step S33).

On the other hand, if the increase situation of the overhead is less than the increase situation of the corresponding throughput (step S32: No), the eNB 200 resumes the update of the performance index (step S34).

Figure 13:
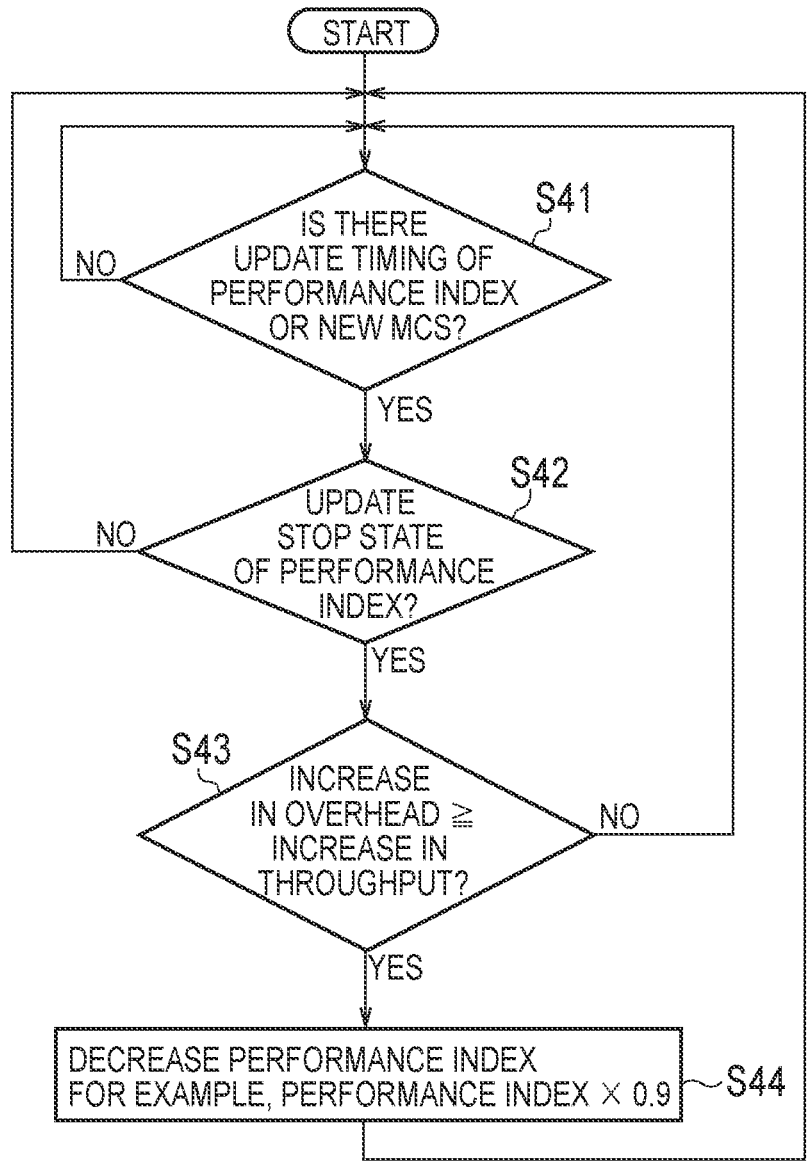
FIG. 13 is a diagram illustrating modification 1 of the flow illustrated in FIG. 12.

FIG. 13 is a diagram illustrating modification 1 of the flow illustrated in FIG. 12. As illustrated in FIG. 13, when an update timing of a performance index or a new data rate is derived (that is, when there is a new MCS) (step S41: Yes) and the eNB 200 is in an update stop state of the performance index (step S42: Yes), the eNB 200 compares an overhead increase situation with a corresponding throughput situation (step S43). If the overhead increase situation is equal to or greater than the corresponding throughput situation (step S43: Yes), the eNB 200 decreases the performance index by multiplying the performance index by a coefficient less than 1 (step S44).

Figure 14:
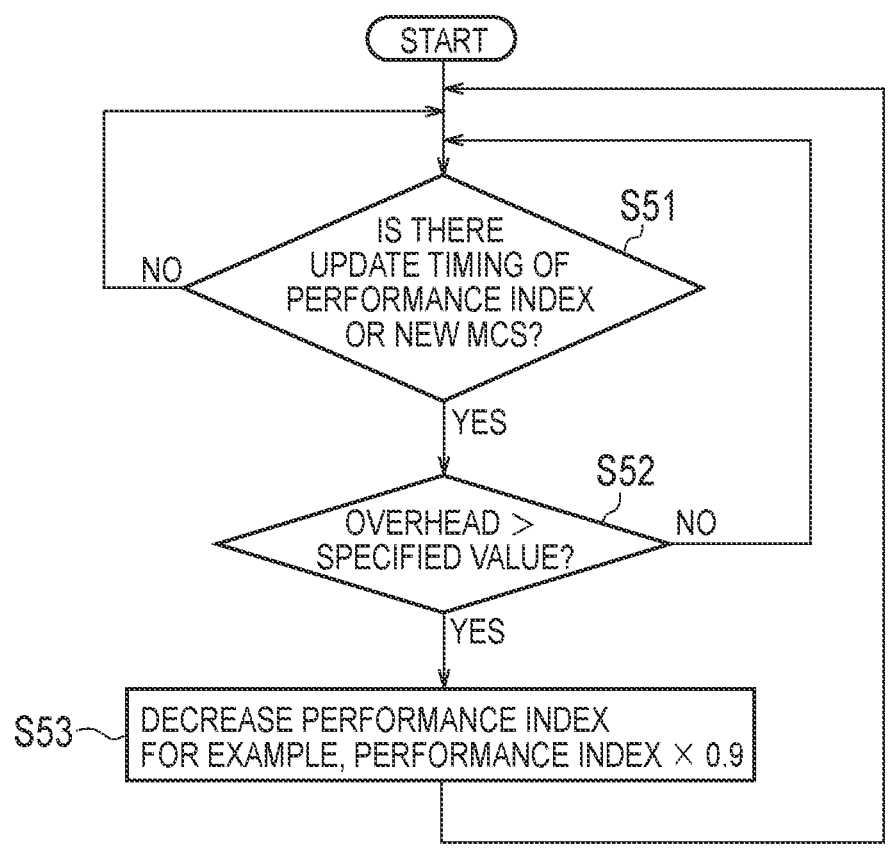
FIG. 14 is a diagram illustrating modification 2 of the flow illustrated in FIG. 12.

FIG. 14 is a diagram illustrating modification 2 of the flow illustrated in FIG. 12. As illustrated in FIG. 14, when an update timing of a performance index or a new data rate is derived (that is, when there is a new MCS) (step S51: Yes) and the overhead exceeds a specified value (for example, a value set by an operator or the like) (step S52: Yes), the eNB 200 decreases the performance index by multiplexing the performance index by a coefficient less than 1 (step S53).

Modification 3 of First Embodiment

In the first embodiment described above, the target UEs 100 may be classified into a plurality of groups according to the priorities or categories, and the flow of FIG. 8 may be applied to each group. Specifically, the eNB 200 configures and updates the performance index for each group, and calculates the transmission performance (data rate) with respect to the target UE 100 for each group. Then, the eNB 200 compares the transmission performance with the performance index for each group and controls the CSI feedback.

In addition, the eNB 200 may select the target UE 100 with the higher priority or category as the specific target UE 100 and may transmit the "2D UE-specific CSI-RS" unconditionally (while ignoring the overhead).

Other Modifications

In the first embodiment described above, an example of switching from the CSI feedback using the existing CSI-RS to the CSI feedback using the "2D UE-specific CSI-RS" in the specific target UE 100 has been described. In addition, an example in which the existing CSI-RS is a common reference signal for one-dimensional channel estimation and the "2D UE-specific CSI-RS" is a dedicated reference signal for two-dimensional channel estimation has been described.

However, the existing CSI-RS may be read as a "common reference signal for channel estimation" and the "2D UE-specific CSI-RS" may be read as a "dedicated reference signal for channel estimation". Alternatively, the existing CSI-RS may be read as a "first channel estimation reference signal" and the "2D UE-specific CSI-RS" may be read as a "second channel estimation reference signal". In this case, the first channel estimation reference signal and the second channel estimation reference signal may share the same antenna port (number), or may be defined as different antenna ports (numbers).

In the first embodiment described above, the LTE system has been exemplified as the radio communication system. However, the present invention is not limited to the LTE system. The present invention may be applied to radio communication systems other than the LTE system.

Supplementary Note of First Embodiment

1. Introduction

With RAN plenary #68, elevation beamforming and full dimension (FD) MIMO WI were approved. For both periodic and aperiodic CSI reports, it is one of the objectives of this WI to specify improvements in the CSI report, including the extension of the Rel-12 CSI reporting mechanism. This supplementary note describes CSI measurement and report considerations.

2. Problems When Considering CSI Report

The results of elevation beamforming and full dimension (FD) MIMO of LTE SI are summarized in TR 36.897.

From TR 36.897, it can be seen that there are three main types for enhancing the function of CSI-RS for FDD. The first is a beamformed CSI-RS based scheme. The second is a non-precoded CSI-RS based scheme. The third is enhancement of hybrid beamforming CSI-RS and non-precoded CSI-RS. Several specific schemes have been further studied at the SI stage for each type of enhancement of CSI-RS.

For example, for the beamformed CSI-RS based extension function, some schemes configure a single CSI process and a single or multiple NZP CSI-RS resources on the UE, and the UE reports the preferred CSI according to each specific scheme reporting CSI (PMI, CQI, RI, or beam index) (in some schemes, after configuring a plurality of CSI processes to the UE).

With respect to the non-precoding CSI-RS based scheme, all port mapping that can measure all MIMO channels in the UE as well as separate CSI-RS reports in the vertical and horizontal directions, and partial port mapping for subsampling time, frequency, and/or spatial domain have been studied.

In order to enhance hybrid beamforming CSI-RS and non-precoded CSI-RS, two CSI processes are usually required. One is for non-precoded CSI measurement and report in the first step, and the other is for the further report of beamformed CSI measurement in response to the first step of non-precoded CSI report.

Although the advantages and disadvantages of these schemes are not compared, the trade-off between the overhead and the measurement/transmission performance needs to be studied when considering the reinforcement of CSI-RS. Improving performance with the increase in overhead is usually not too difficult. It is important to make an initial effort to improve performance with no increase or slight increase in overhead.

Proposal 1: Overhead should be considered first so as to improve performance with no increase or slight increase.

Intuitively, it can be understood that transmission performance, for example, throughput, can be improved by using FD-MIMO. However, all the UEs need to further improve the throughput. For example, some UEs very close to the eNB may be able to achieve sufficient throughput by using a conventional one-dimensional antenna array CSI process.

Discussion 1: In order for some UEs to achieve sufficient throughput, a conventional one-dimensional antenna array CSI process may be sufficient.

In addition, a legacy UE may naturally not be able to cope with the FD-MIMO CSI process depending on the result of this WI. When considering CSI-RS measurement and report, the compatibility with the legacy UE should also be considered.

Discussion 2: The legacy UE may not be able to deal with the extended function of the FD-MIMO CSI-RS, and the compatibility is a problem.

3. 2-Step CSI Report

Based on the discussion in Section 2, 2-step CSI report to be introduced below should be considered.

As described in Section 2, that a conventional one-dimensional antenna array CSI process is sufficient for some UEs to achieve sufficient throughput is considered and the compatibility with legacy UEs should be considered. A standardized legacy CSI process for one-dimensional antenna array can be used as CSI measurement and report of the first step. That is, the eNB first transmits the conventional one-dimensional antenna array CSI-RS. The UE measures the channel and feeds CSI (PMI, CQI, RI) back to the eNB based on the measurement result. Based on the CSI reported by the UE, the eNB determines the MCS and starts data transmission.

Since the first step of CSI measurement and report is only using the legacy CSI process, no additional overhead is introduced and the legacy UE can operate normally.

Next, as the CSI measurement and report of the second step, among UEs capable of processing 2D AAS CSI-RS (indicated by RRC UE capability information exchange) and/or UEs requesting higher throughput data transmission, the eNB selects the UEs according to some predefined criteria (which can be throughput expectations or simply the average throughput of the cell), requests aperiodic CSI reports from the selected UEs, and transmits 2D AAS UE-specific CSI-RS to the selected UEs based on the CSI report in the first step. The related UE measures the channel again in response to the 2D AAS UE-specific CSI-RS and reports the new CSI to the eNB. Based on the CSI report of the new second step, the eNB determines the new MCS and transmits the data by using the new MCS.

Regarding the CSI report of the second step, since the 2D AAS UE-specific CSI-RS that brings the higher resolution measurement result is usually used, the improvement in the transmission characteristics in the statistical sense can be achieved. The merit of 2-step CSI measurement and report is summarized as follows.

The compatibility with the legacy UE, that is, the legacy UE can operate normally.

No additional overhead is introduced for UEs that do not require 2D AAS CSI-RS.

A slight increase in overhead can be expected and the required transmission performance can be expected, that is, the best tradeoff between performance and overhead is realized.

Proposal 2: The 2-step CSI report should be considered to achieve the best trade-off between performance and overhead and achieve the compatibility with legacy UEs.

Second Embodiment

In the second embodiment, differences from the first embodiment will be described below.

Overview of Second Embodiment

In a mobile communication system, a multi-input multi-output (MIMO) technology for transmitting signals by using a plurality of transmission antennas and a plurality of reception antennas is widely used.

In a downlink MIMO, a base station transmits a plurality of data sequences to one radio terminal by spatial division multiplexing (SDM) using the same radio resources (time and frequency resources). Such a method is referred to as single-user MIMO (SU-MIMO). Alternatively, the base station transmits a plurality of data sequences to different radio terminals by SDM using the same radio resources. Such a method is referred to as multi-user MIMO (MU-MIMO).

In addition, the base station transmits a reference signal for feedback of channel state information (CSI) from each antenna. Such a reference signal is referred to as a channel state information-reference signal (CSI-RS). The CSI-RS is a reference signal common to a plurality of radio terminals in the cell of the base station.

The radio terminal generates CSI related to a downlink channel state by performing channel estimation by using the CSI-RS received from the base station, and transmits (feeds back) the generated CSI to the base station. The base station controls downlink data transmission based on the CSI fed back from the radio terminal.

However, the arrangement of the CSI-RS is sparse. For example, in the Long Term Evolution (LTE) system, the CSI-RS is transmitted in a plurality of subframes with a long cycle of about one time. Therefore, there is a problem that CSI feedback using the CSI-RS is difficult to obtain highly accurate CSI.

In addition, if implementing a massive MIMO in which a large number of antennas are provided at the base station, there is a problem that the amount of CSI-RS to be transmitted increases, that is, the overhead increases.

Therefore, the second embodiment aims to provide a radio terminal, a base station, and a processor, which can obtain high-precision CSI while suppressing an increase in overhead.

The radio terminal according to the second embodiment includes a controller. The controller performs a process of receiving, from a base station, a terminal-specific reference signal that is a demodulation reference signal transmitted individually to the radio terminal by the base station, and a process of transmitting, to the base station, channel state information generated by channel estimation using the terminal-specific reference signal.

The channel state information may be channel quality information.

The channel state information may be interference information.

The terminal-specific reference signal is included in an allocated radio resource allocated to the radio terminal by the base station. In the radio terminal, the controller may perform a process of receiving the terminal-specific reference signal from the base station together with the downlink data included in the allocated radio resource, and a process of not only demodulating the downlink data but also generating the channel state information by the channel estimation using the terminal-specific reference signal.

In the radio terminal, the controller may perform a process of receiving downlink control information from the base station via a physical downlink control channel, and a process of transmitting the channel state information to the base station when instruction information indicating the transmission instruction of the channel state information is included in the downlink control information.

The downlink control information includes allocation information indicating an allocated radio resource allocated to the radio terminal by the base station. In the radio terminal, if the allocation information and the instruction information are included in the downlink control information, the controller may perform a process of transmitting, to the base station, the channel state information generated by the channel estimation using the terminal-specific reference signal included in the allocated radio resource.

In the radio terminal, the controller may perform a process of transmitting, to the base station, response information indicating whether the reception of the downlink data from the base station has been successful, and a process of transmitting the channel state information to the base station at the transmission timing of the response information.

In the radio terminal, the controller may transmit, to the base station as the channel state information, information indicating a difference between past channel state information transmitted to the base station before the current timing and current channel state information corresponding to the current timing.

The base station according to the second embodiment includes a controller. The controller performs a process of transmitting, to a radio terminal, a terminal-specific reference signal that is a demodulation reference signal transmitted individually to the radio terminal, and a process of receiving, from the radio terminal, channel state information generated by channel estimation using the terminal-specific reference signal by the radio terminal.

The channel state information may be channel quality information.

The channel state information may be interference information.

The terminal-specific reference signal is included in an allocated radio resource allocated to the radio terminal by the base station. The terminal-specific reference signal may be used not only for demodulation of downlink data included in the allocated radio resource but also for generation of the channel state information.

In the base station, the controller may perform a process of including, in the downlink control information, instruction information indicating the transmission instruction of the channel state information, and a process of transmitting the downlink control information including the instruction information to the radio terminal through the physical downlink control channel.

In the base station, the controller may perform a process of including the instruction information in the downlink control information together with allocation information indicating the allocated radio resource allocated to the radio terminal by the base station.

In the base station, the controller may perform a process of receiving, from the radio terminal, response information indicating whether the reception of the downlink data transmitted by the base station has been successful, and a process of receiving the channel state information from the radio terminal at the reception timing of the response information.

In the base station, the controller may receive, from the radio terminal as the channel state information, information indicating a difference between past channel state information received from the radio terminal before the current timing and current channel state information corresponding to the current timing.

The processor according to the second embodiment controls the radio terminal. The processor performs a process of receiving, from a base station, a terminal-specific reference signal that is a demodulation reference signal transmitted individually to the radio terminal by the base station, and a process of transmitting, to the base station, channel state information generated by channel estimation using the terminal-specific reference signal.

Overview of Operation According to Second Embodiment

An LTE system according to the second embodiment supports a downlink MIMO. In the SU-MIMO, the eNB 200 transmits a plurality of data sequences to one UE 100 by SDM using the same radio resources (time and frequency resources). In the MU-MIMO, the eNB 200 transmits a plurality of data sequences to different UEs 100 by SDM using the same radio resources.

Furthermore, the eNB 200 transmits, from each antenna (each antenna port), a terminal-specific reference signal (UE-specific RS), which is a demodulation reference signal used for channel estimation for data demodulation. The UE-specific RS is a reference signal transmitted individually by the eNB 200. The UE-specific RS is included in the allocated radio resource (PDSCH resource) allocated to the UE 100 by the eNB 200. That is, the UE-specific RS is transmitted in the antenna and the allocated radio resource used for transmitting the downlink data to the UE 100.

Figure 15:
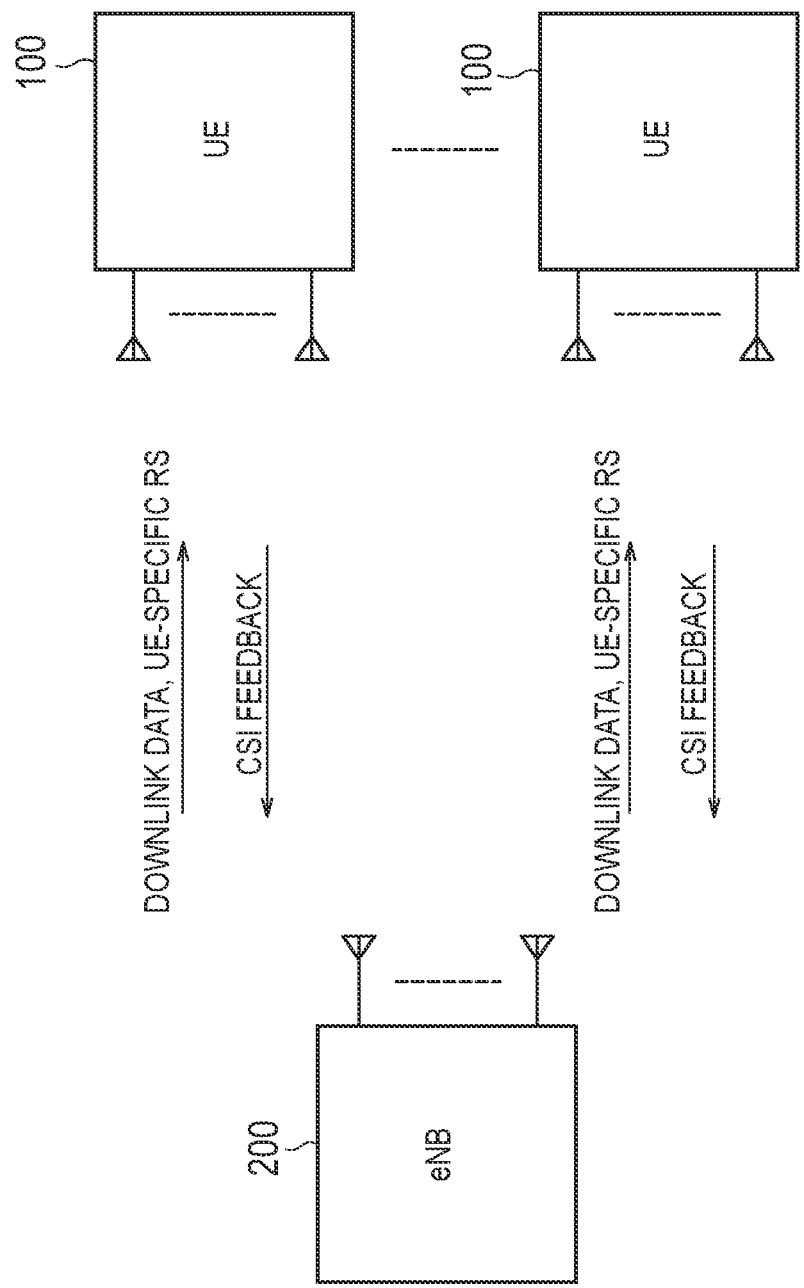
FIG. 15 is a diagram illustrating an overview of an operation according to a second embodiment.

FIG. 15 is a diagram illustrating the overview of the operation according to the second embodiment. As illustrated in FIG. 15, the UE 100 receives, from the eNB 200, a UE-specific RS that is a demodulation reference signal transmitted individually to the UE by the eNB 200. The UE 100 transmits, to the eNB 200, the CSI generated by the channel estimation using the UE-specific RS. The eNB 200 receives the CSI generated by the UE 100 from the UE 100 by the channel estimation using the UE-specific RS. The CSI is, for example, channel quality information (CQI). As will be described in detail later, the CQI may be one CQI generated for the entire resources allocated for the PDSCH.

Alternatively, the CSI may be interference information. The interference indicated by the interference information includes interference by signals of other layers from the eNB 200 transmitting the UE-specific RS, interference by signals from the surroundings, noise, and the like. It is noted that the CSI also includes PMI, RI, and the like.

The UE-specific RS is included in the PDSCH resource (resource block) allocated to the UE 100 by the eNB 200. Therefore, if the eNB 200 frequently allocates the PDSCH resource to the UE 100, the UE 100 frequently receives the UE-specific RS, and thus highly accurate CSI can be obtained by using the UE-specific RS.

In addition, if implementing a massive MIMO in which a large number of antennas are provided in the eNB 200, the UE-specific RS can be transmitted from each antenna used for transmitting downlink data to the UE 100. Therefore, by using the UE-specific RS for CSI feedback, additional CSI-RS can be made unnecessary even when the massive MIMO is implemented.

Therefore, according to the second embodiment, highly accurate CSI can be obtained while suppressing an increase in overhead.

Radio Terminal According to Second Embodiment

Figure 16:
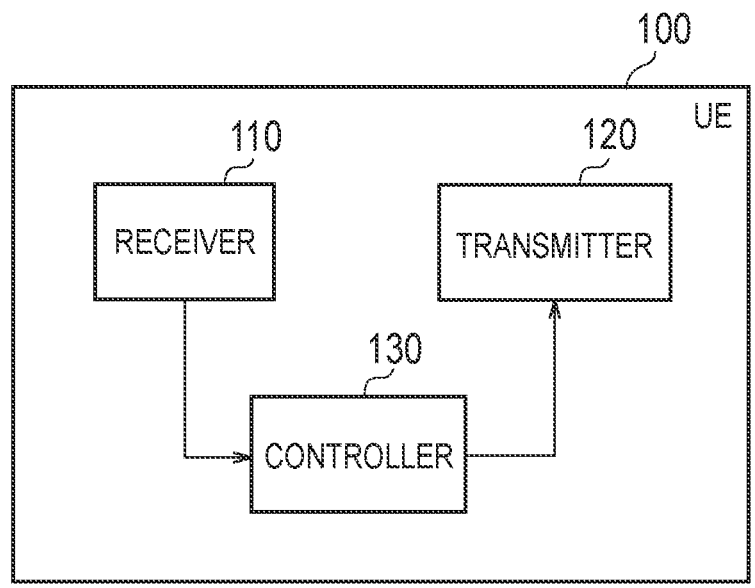
FIG. 16 is a block diagram of a UE (radio terminal).

Next, the structure of the UE 100 (radio terminal) will be described. FIG. 16 is a block diagram of the UE 100. As illustrated in FIG. 16, the UE 100 includes a receiver 110, a transmitter 120, and a controller 130.

The receiver 110 performs a variety of reception under the control of the controller 130. The receiver 110 includes a plurality of antennas and a reception apparatus. The reception apparatus converts radio signals received by the plurality of antennas into a baseband signal (reception signal) and outputs the baseband signal to the controller 130. The transmitter 120 performs a variety of transmission under the control of the controller 130. The transmitter 120 includes a plurality of antennas and a transmission apparatus. The transmission apparatus converts a baseband signal (transmission signal) output by the controller 130 into a radio signal and transmits the radio signal from the plurality of antennas.

The controller 130 performs a variety of control on the UE 100. The controller 130 includes a processor and a memory. The memory stores a program executed by the processor, and information used for processing by the processor. The processor includes a baseband processor that performs modulation and demodulation, coding and decoding, and the like of the baseband signal, and a central processing unit (CPU) that performs a variety of processes by executing a program stored in the memory. The processor may include a codec that performs coding and decoding of an audio or video signal. The processor performs the above-described process and a process to be described later.

In the second embodiment, the controller 130 performs a process of receiving, from the eNB 200, the UE-specific RS that is a demodulation reference signal transmitted individually to the UE by the eNB 200, and a process of transmitting, to the eNB 200, the CSI generated by the channel estimation using the UE-specific RS. Specifically, the controller 130 performs a process of receiving the UE-specific RS from the eNB 200 together with the downlink data included in the allocated PDSCH resource, and a process of demodulating the downlink data and generating the CSI by the channel estimation using the UE-specific RS.

In the second embodiment, the controller 130 performs a process of receiving the DCI from the eNB 200 through the PDCCH, and a process of transmitting the CSI to the eNB 200 when the instruction information indicating the transmission instruction of the CSI based on the UE-specific RS is included in the DCI. In other words, the controller 130 transmits the CSI to the eNB 200 based on the UE-specific RS with a trigger by the DCI. Therefore, the eNB 200 can obtain the CSI as necessary. The instruction information is, for example, a 1-bit flag. Alternatively, a new DCI format for the CSI feedback using the UE-specific RS may be introduced. In this case, the information indicating the new DCI format may be regarded as instruction information. Alternatively, instead of transmitting the instruction information by the DCI, the instruction information may be transmitted by signaling of an upper layer (MAC, RRC, or the like) than the physical layer. The instruction information by the MAC or the RRC may be information instructing to perform the CSI feedback using the UE-specific RS whenever there is PDSCH allocation using the UE-specific RS.

The DCI includes allocation information (downlink SI) indicating an allocated PDSCH resource allocated to the UE 100 by the eNB 200. In the second embodiment, if the allocation information and the instruction information are included in the DCI, the controller 130 may perform a process of transmitting, to the eNB 200, the CSI based on the UE-specific RS included in the allocated PDSCH resource indicated by the allocation information. Therefore, it is possible to obtain the CSI related to the channel state within the range of the PDSCH resource allocated to the UE 100. Therefore, a sub-band CSI (sub-band CQI) used in a general LTE system may be unnecessary.

If such an operation is performed, the controller 130 performs not only the wideband CSI (wideband CQI) or the sub-band CSI (sub-band CQI) used in the general LTE system but also the CSI feedback for the entire PDSCH resource range or the subset thereof. For this "subset", the UE 100 may be notified from the eNB 200 by signaling in DCI or MAC/RRC.

In addition, if the PDSCH is allocated by using the UE-specific RS at a plurality of antenna ports (that is, if a plurality of layers is allocated to the UE 100), the controller 130 generates the CSI corresponding to each UE-specific RS. In particular, in the case of the CQI, the CQI feedback can take the following four patterns.

(1) The CQI is fed back to each UE-specific RS one by one.

(2) One CQI for one UE-specific RS and one difference CQI for the other UE-specific RS with one CQI as a reference are fed back.

(3) Only one CQI is fed back to a plurality of UE-specific RSs.

(4) The CQI is fed back one by one for each codeword. It is noted that one codeword includes a layer corresponding to one or more UE-specific RSs.

In the second embodiment, the controller 130 may perform a process of transmitting, to the eNB 200, HARQ ACK/NACK indicating whether the reception of the downlink data from the eNB 200 has been successful, and a process of transmitting the CSI to the eNB 200 at the transmission timing of the HARQ ACK/NACK. That is, the controller 130 aligns the timing of the CSI feedback using the UE-specific RS with the transmission timing of the HARQ ACK/NACK. This makes it possible for the eNB 200 to predict the timing of the CSI feedback. In the case of the FDD, the transmission timing of the HARQ ACK/NACK is four subframes after the subframe having received the downlink data. In the case of the TDD, the transmission timing of the HARQ ACK/NACK depends on the TDD radio frame configuration.

In the second embodiment, the controller 130 may perform a process of transmitting, to the eNB 200 as the CSI, information indicating a difference between the past CSI transmitted to the eNB 200 before the current timing and the current CSI corresponding to the current timing. That is, the controller 130 performs a difference feedback of the CSI. Therefore, it is possible to reduce the information amount of the CSI. As an example, if the CSI related to the difference feedback is 1 bit, it is possible to express two patterns (+1/−1). If the CSI related to the difference feedback is 2 bits, four patterns (+1/0/−1/−3) can be expressed.

Base Station According to Second Embodiment

Figure 17:
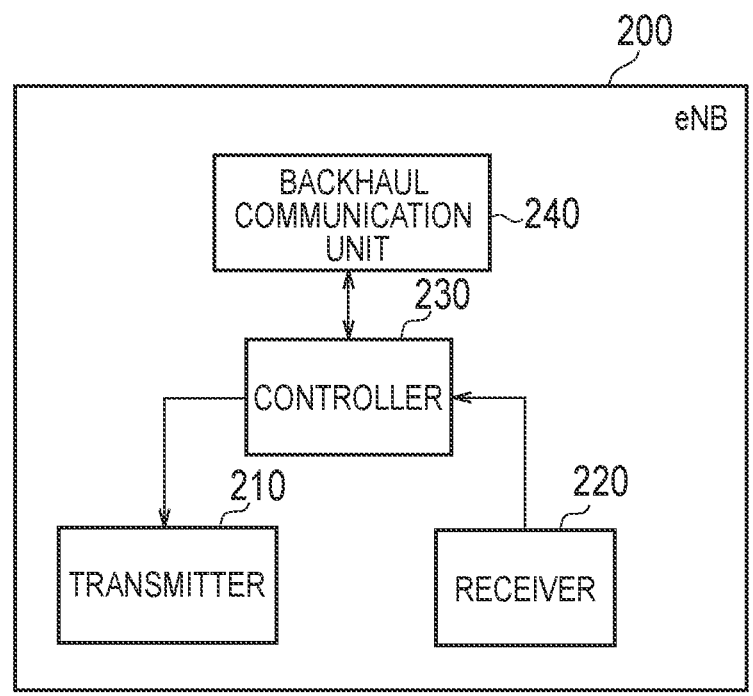
FIG. 17 is a block diagram of an eNB (base station).

Next, the structure of the eNB 200 (base station) will be described. FIG. 17 is a block diagram of the eNB 200. As illustrated in FIG. 17, the eNB 200 includes a transmitter 210, a receiver 220, a controller 230, and a backhaul communication unit 240.

The transmitter 210 performs a variety of transmission under the control of the controller 230. The transmitter 210 includes a plurality of antennas and a transmission apparatus. The transmission apparatus converts a baseband signal (transmission signal) output by the controller 230 into a radio signal and transmits the radio signal from the plurality of antennas. The receiver 220 performs a variety of reception under the control of the controller 230. The receiver 220 includes a plurality of antennas and a reception apparatus. The reception apparatus converts radio signals received by the plurality of antennas into a baseband signal (reception signal) and outputs the baseband signal to the controller 230.

The controller 230 performs a variety of control on the eNB 200. The controller 230 includes a processor and a memory. The memory stores a program executed by the processor, and information used for processing by the processor. The processor includes a baseband processor that performs modulation and demodulation, coding and decoding, and the like of the baseband signal, and a central processing unit (CPU) that performs a variety of processes by executing a program stored in the memory. The processor performs the above-described process and a process to be described later.

The backhaul communication unit 240 is connected to the neighbor eNB 200 via an X2 interface and connected to the MME/S-GW 300 via an S1 interface. The backhaul communication unit 240 is used for communication performed on the X2 interface, communication performed on the S1 interface, and the like.

In the second embodiment, the controller 230 performs a process of transmitting, to the UE 100, the UE-specific RS that is a demodulation reference signal to be transmitted individually to the UE, and a process of receiving, from the UE 100, the CSI generated by the channel estimation using the UE-specific RS by the UE 100. The UE-specific RS is used not only for demodulation of the downlink data included in the allocated PDSCH resource but also for generation of the CSI.

The eNB 200 controls downlink data transmission based on the CSI fed back from the UE 100. For example, the eNB 200 generates a transmission precoding weight that suppresses interference between UEs, based on the CSI, multiplies the downlink data (data sequence) and the UE-specific RS by transmission precoding weight, and performs downlink data transmission by beamforming. At that time, the eNB 200 allocates the resource block corresponding to the CSI to the UE 100 and performs the downlink data transmission. In addition, the eNB 200 determines the MCS based on the CSI, and performs the downlink data transmission by using the determined MCS.

In the second embodiment, the controller 230 may perform a process of including, in the DCI, instruction information indicating the transmission instruction of the CSI based on the UE-specific RS in the DCI, and a process of transmitting the DCI including the instruction information to the UE 100 through the PDCCH. In addition, the controller 230 may perform a process of including the instruction information in the DCI together with allocation information indicating the allocated PDSCH resource allocated to the UE 100 by the eNB 200. That is, when the PDSCH resource (resource block) required by the CSI feedback is allocated to the UE 100, the eNB 200 instructs the CSI feedback of the PDSCH resource to the UE 100. Therefore, the eNB 200 can obtain the CSI for a desired resource block.

Alternatively, instead of transmitting the instruction information by the DCI, the instruction information may be transmitted by signaling of an upper layer (MAC, RRC, or the like) than the physical layer. The instruction information by the MAC or the RRC may be information instructing to perform the CSI feedback using the UE-specific RS whenever there is PDSCH allocation using the UE-specific RS.

In addition, as described above, the CSI feedback is not only the wideband CSI (wideband CQI) or the sub-band CSI (sub-band CQI) used in the general LTE system but also the CSI feedback for the entire PDSCH resource range or the subset thereof. The controller 230 may notify the "subset" to the UE 100 during the DCI or signaling with MAC or RRC.

In the second embodiment, the controller 230 may performs a process of receiving, from the UE 100, HARQ ACK/NACK indicating whether the reception of the downlink data transmitted by the eNB 200 has been successful, and a process of receiving the CSI from the UE 100 at the reception timing of the HARQ ACK/NACK.

In the second embodiment, the controller 230 may perform a process of receiving, from the UE 100 as the CSI, information indicating a difference between the past CSI received from the UE 100 before the current timing and the current CSI corresponding to the current timing. The controller 230 derives the current CSI by accumulating the CSI related to the difference feedback based on the difference feedback of the CSI.

Operation Sequence According to Second Embodiment

Figure 18:
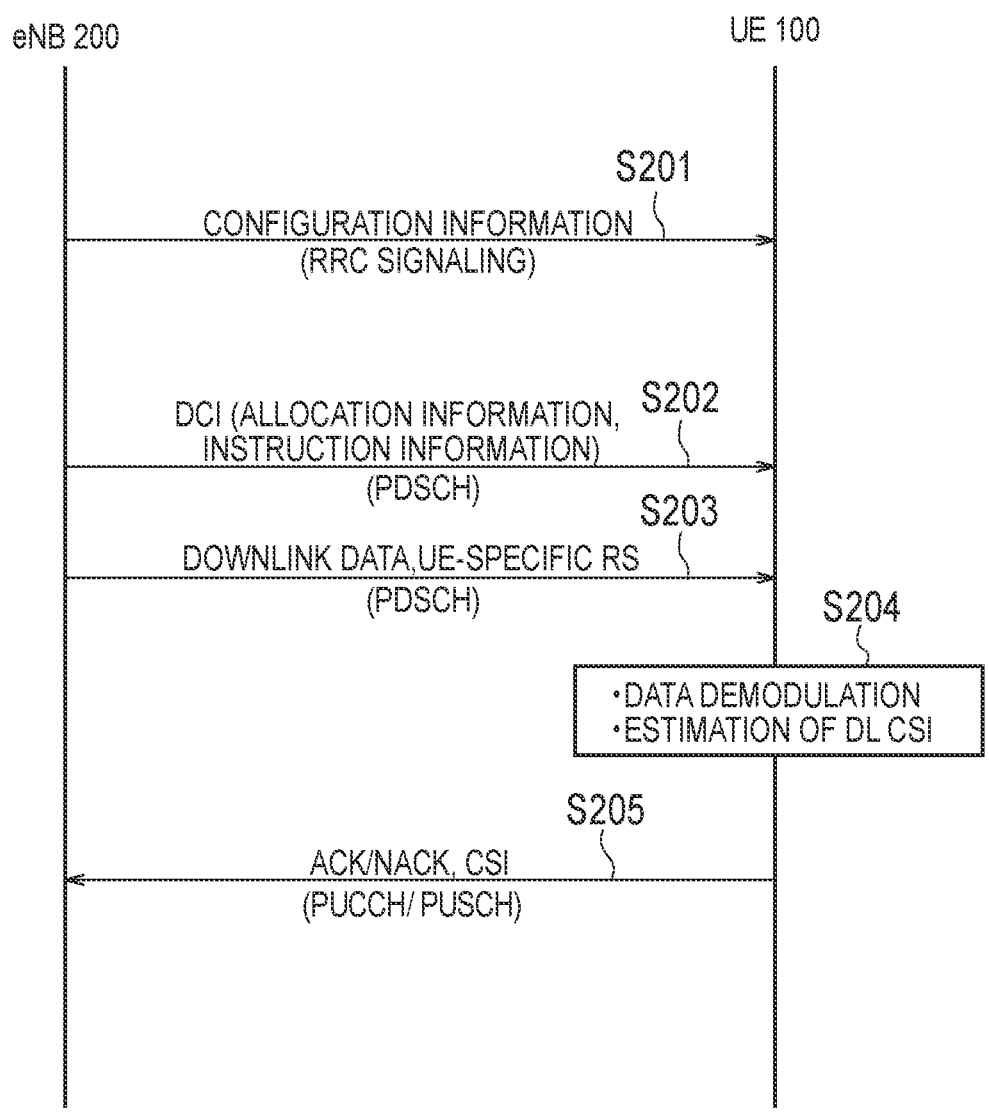
FIG. 18 is a sequence diagram illustrating an example of an operation sequence according to the second embodiment.

Next, an example of an operation sequence according to the second embodiment will be described. FIG. 18 is a sequence diagram illustrating an example of the operation sequence according to the second embodiment. In an initial state of FIG. 18, the UE 100 is in an RRC connected mode in the cell of the eNB 200.

As illustrated in FIG. 18, in step S201, the eNB 200 transmits, to the UE 100, the configuration information about the CSI feedback using the UE-specific RS by RRC signaling. The UE 100 stores the configuration information received from the eNB 200 and performs the CSI feedback using the UE-specific RS based on the configuration information.

Specific examples of the configuration information include the following information (1) to (3).

(1) Information Requesting CSI Feedback Using UE-Specific RS

This information is, for example, a transmission mode (for example, TM 9a) for the CSI feedback using the UE-specific RS or an information element (IE) requesting the CSI feedback using the UE-specific RS. If such information is configured, the UE 100 performs the CSI feedback based on the UE-specific RS at all times or with a trigger by the DCI.

(2) Information Specifying PUCCH Resource for CSI Feedback

If the feedback is performed by the PUCCH, a new PUCCH (for example, PUCCH format 5) is defined since it cannot be transmitted in the conventional PUCCH format. Then, the eNB 200 configures information (for example, resource block, cyclic shift, or the like) for designating the resource in the UE 100.

(3) Configuration Information About Whether to Set One CSI Feedback For Entire Resource of the PDSCH Allocation Resource, one CSI Feedback Divided For Each Subset, or Both Feedbacks In addition, if the CSI feedback is to be performed in the subset, information for specifying the subset (for example, dividing by 6 RB units) may be necessary. However, it may be set to a predetermined value according to the specification.

In step S202, the eNB 200 transmits the DCI to the UE 100 through the PDCCH. The DCI includes allocation information indicating the allocated PDSCH resource (resource block) allocated to the UE 100 by the eNB 200, and instruction information indicating the transmission instruction of the CSI based on the UE-specific RS. In addition, the DCI may also include information designating the PUSCH resource for the feedback of the CSI. The information designating the PUSCH resource may be information corresponding to UL grant. Alternatively, a part of information such as RB is common to the PDSCH resource allocation information, and the information designating the PUSCH resource may be other information only. The UE 100 receives the DCI from the eNB 200 and specifies the allocated PDSCH resource based on the allocation information.

In step S203, the eNB 200 transmits the downlink data and the UE-specific RS to the UE 100 by using the allocated PDSCH resource. The UE 100 receives the UE-specific RS from the eNB 200 together with the downlink data included in the allocated PDSCH resource.

In step S204, the UE 100 demodulates the downlink data and generates the CSI by the channel estimation using the UE-specific RS. In addition, the UE 100 decodes the downlink data and generates HARQ ACK/NACK indicating success or failure of decoding.

In step S205, the UE 100 transmits the CSI to the eNB 200 at the transmission timing of the HARQ ACK/NACK. Specifically, the UE 100 transmits the ACK/NACK and the CSI to the eNB 200 through the PUCCH or the PUSCH. Such a CSI feedback may be the difference feedback described above. The eNB 200 receives the ACK/NACK and the CSI.

Other Modifications

In the second embodiment described above, the antenna configuration used for the massive MIMO has not been specifically mentioned. As the antenna configuration used for the massive MIMO, the eNB 200 may use an array antenna having antennas (antenna ports) arranged two-dimensionally in the horizontal direction and the vertical direction. FIG. 19 is a diagram illustrating an example of an array antenna. In the example illustrated in FIG. 19, the antenna array has a total of sixteen antennas, that is, four in the horizontal direction and four in the vertical direction, but may have more antennas. The MIMO using such an antenna array is referred to as full-dimension MIMO (FD-MIMO), and it is possible to control directionality in the vertical direction as well as in the horizontal direction.

The second embodiment can be implemented in combination with the first embodiment. For example, a part of the components according to the second embodiment may be added to the first embodiment, or a part of the components according to the second embodiment may be replaced with a part of the components according to the first embodiment.

In the second embodiment described above, the LTE system has been exemplified as the mobile communication system. However, the present invention is not limited to the LTE system. The present invention may be applied to mobile communication systems other than the LTE system.

INDUSTRIAL APPLICABILITY

The present invention is useful in the communication field.

The invention claimed is:

1. A base station comprising:
a controller configured to perform a process of transmitting a dedicated reference signal that is a reference signal used for measurement of channel characteristics and is individually generated for a radio terminal,
wherein the controller is configured to select a specific target radio terminal from among target radio terminals to be connected to the base station, and perform a process of transmitting the dedicated reference signal only to the specific target radio terminal,
wherein the controller is configured to:
perform a process of transmitting a common reference signal that is a reference signal used for measurement of channel characteristics and is common to the target radio terminals; and
based on the process, select the specific target radio terminal.

2. The base station according to claim 1, wherein the base station is configured to support full-dimension MIMO (FD-MIMO), and
the base station further comprises an antenna array having antenna elements arranged two-dimensionally in a horizontal direction and a vertical direction.

3. The base station according to claim 2, wherein the controller is configured to determine a radio terminal supporting the FD-MIMO as the target radio terminals, based on capability information of each radio terminal connected to the base station.

4. The base station according to claim 1, wherein the dedicated reference signal is a reference signal used for measurement of channel characteristics performed two-dimensionally in a horizontal direction and a vertical direction, and
the common reference signal is a reference signal used for measurement of channel characteristics in one dimension.

5. The base station according to claim 1, wherein the controller is configured to:
receive, from the target radio terminals, channel state information fed back based on the common reference signal;
compare downlink data transmission performance derived based on the channel state information with a performance index; and
select a target radio terminal, of which the data transmission performance is lower than the performance index, as the specific target radio terminal.

6. The base station according to claim 5, wherein the performance index is an average downlink data transmission performance of all the target radio terminals.

7. The base station according to claim 1, wherein the controller is configured to select, as the specific target radio terminal, a radio terminal having transmitted, to the base station, request information for requesting the transmission of the dedicated reference signal.

8. A radio terminal comprising:
a controller configured to perform:
a process of receiving, from a base station, a terminal-specific reference signal that is a demodulation reference signal transmitted individually to a radio terminal by the base station; and
a process of transmitting, to the base station, channel state information generated by channel estimation using the terminal-specific reference signal,
wherein the controller is configured to perform:
a process of receiving downlink control information from the base station through a physical downlink control channel; and
a process of transmitting the channel state information to the base station if instruction information indicating a transmission instruction of the channel state information is included in the downlink control information,
wherein the downlink control information includes allocation information indicating an allocated radio resource allocated to the radio terminal by the base station, and
if the allocation information and the instruction information are included in the downlink control information, the controller is configured to perform a process of transmitting, to the base station, the channel state information generated by the channel estimation using the terminal-specific reference signal included in the allocated radio resource.

9. The radio terminal according to claim 8, wherein the channel state information is channel quality information.

10. The radio terminal according to claim 8, wherein the channel state information is interference information.

11. The radio terminal according to claim 8, wherein the terminal-specific reference signal is included in an allocated radio resource allocated to the radio terminal by the base station, and
the controller is configured to perform:
a process of receiving the terminal-specific reference signal from the base station together with downlink data included in the allocated radio resource; and
a process of demodulating the downlink data and generating the channel state information by the channel estimation using the terminal-specific reference signal.

12. The radio terminal according to claim 8, wherein the controller is configured to perform:
a process of transmitting, to the base station, response information indicating whether reception of downlink data from the base station has been successful; and
a process of transmitting the channel state information to the base station at a transmission timing of the response information.

13. The radio terminal according to claim 8, wherein the controller is configured to perform a process of transmitting, to the base station as the channel state information, information indicating a difference between past channel state information transmitted to the base station before a current timing and current channel state information corresponding to the current timing.

14. A base station comprising:
a controller configured to perform:
a process of transmitting, to a radio terminal, a terminal-specific reference signal that is a demodulation reference signal transmitted individually to the radio terminal; and
a process of receiving, from the radio terminal, channel state information generated by the radio terminal by channel estimation using the terminal-specific reference signal,
wherein the controller is configured to perform:
a process of including, in downlink control information, instruction information indicating a transmission instruction of the channel state information; and
a process of transmitting the downlink control information including the instruction information to the radio terminal through a physical downlink control channel;
wherein the controller is configured to perform a process of including the instruction information in the downlink control information together with allocation information indicating the allocated radio resource allocated to the radio terminal by the base station.

15. The base station according to claim 14, wherein the channel state information is channel quality information.

16. The base station according to claim 14, wherein the channel state information is interference information.

17. The base station according to claim 14, wherein the terminal-specific reference signal is included in an allocated radio resource allocated to the radio terminal by the base station, and the terminal-specific reference signal is used not only for demodulation of downlink data included in the allocated radio resource but also for generation of the channel state information.

18. The base station according to claim 14, wherein the controller is configured to perform:

a process of receiving, from the radio terminal, response information indicating whether reception of downlink data transmitted from the base station has been successful; and a process of receiving the channel state information from the radio terminal at a reception timing of the response information.

19. The base station according to claim 14, wherein the controller is configured to perform a process of receiving, from the radio terminal as the channel state information, information indicating a difference between past channel state information received from the radio terminal before a current timing and current channel state information corresponding to the current timing.

* * * * *